US006978282B1

(12) United States Patent
Dings et al.

(10) Patent No.: US 6,978,282 B1
(45) Date of Patent: Dec. 20, 2005

(54) INFORMATION REPLICATION SYSTEM HAVING AUTOMATED REPLICATION STORAGE

(75) Inventors: Thomas Dings, Hopkinton, MA (US); Ajay Shekhar, Medway, MA (US); Neil Schutzman, Marlborough, MA (US); Madhav Mutalik, Southborough, MA (US); Ananthan K. Pillai, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 610 days.

(21) Appl. No.: 09/946,005

(22) Filed: Sep. 4, 2001

(51) Int. Cl.[7] ............................................. G06F 17/30
(52) U.S. Cl. ...................... 707/204; 707/202; 707/200
(58) Field of Search ................................. 707/204, 202, 707/200; 711/162, 170–172, 202

(56) References Cited

U.S. PATENT DOCUMENTS

| | | | | |
|---|---|---|---|---|
| 5,206,939 A | | 4/1993 | Yanai et al. ................. 395/400 |
| 5,485,610 A | * | 1/1996 | Gioielli et al. .............. 707/102 |
| 5,513,192 A | | 4/1996 | Janku et al. ................ 371/50.1 |
| 5,632,012 A | | 5/1997 | Belsan et al. .......... 395/182.04 |
| 5,784,548 A | | 7/1998 | Liong et al. ........... 395/182.04 |
| 5,889,935 A | | 3/1999 | Ofek et al. ............. 395/182.04 |
| 5,928,367 A | | 7/1999 | Nelson et al. .................. 714/6 |
| 5,950,230 A | | 9/1999 | Islam et al. .................. 711/156 |
| 5,987,627 A | | 11/1999 | Rawlings, III ............... 714/48 |
| 6,058,455 A | | 5/2000 | Islam et al. .................. 711/114 |
| 6,101,497 A | | 8/2000 | Ofek ........................... 707/10 |
| 6,311,232 B1 | * | 10/2001 | Cagle et al. ................... 710/8 |
| 6,366,988 B1 | * | 4/2002 | Skiba et al. ................. 711/165 |
| 6,449,688 B1 | * | 9/2002 | Peters et al. ................. 711/112 |
| 6,505,216 B1 | * | 1/2003 | Schutzman et al. ......... 707/204 |
| 6,553,390 B1 | * | 4/2003 | Gross et al. ................. 707/202 |
| 6,578,039 B1 | * | 6/2003 | Kawamura ................. 707/100 |
| 6,584,477 B1 | * | 6/2003 | Mosher, Jr. ................. 707/204 |

OTHER PUBLICATIONS

Internet;www.veritas.com; "A Management Guide to Replicating Critical Data"; VERITAS Storage Replication Products; Veritas; pp. 1-9.
Internet;http://data.storageareanetworking.net/library/whitepapers/wp 190601 2.html; "Storage Virtualization Brief"; Storage Area Networking; pp. 1-17.

* cited by examiner

*Primary Examiner*—Alford Kindred
*Assistant Examiner*—CamLinh Nguyen
(74) *Attorney, Agent, or Firm*—Daly, Crowley, Mofford & Durkee, LLP

(57) ABSTRACT

An information recovery system automatically selects storage for a replication of a data volume.

32 Claims, 26 Drawing Sheets

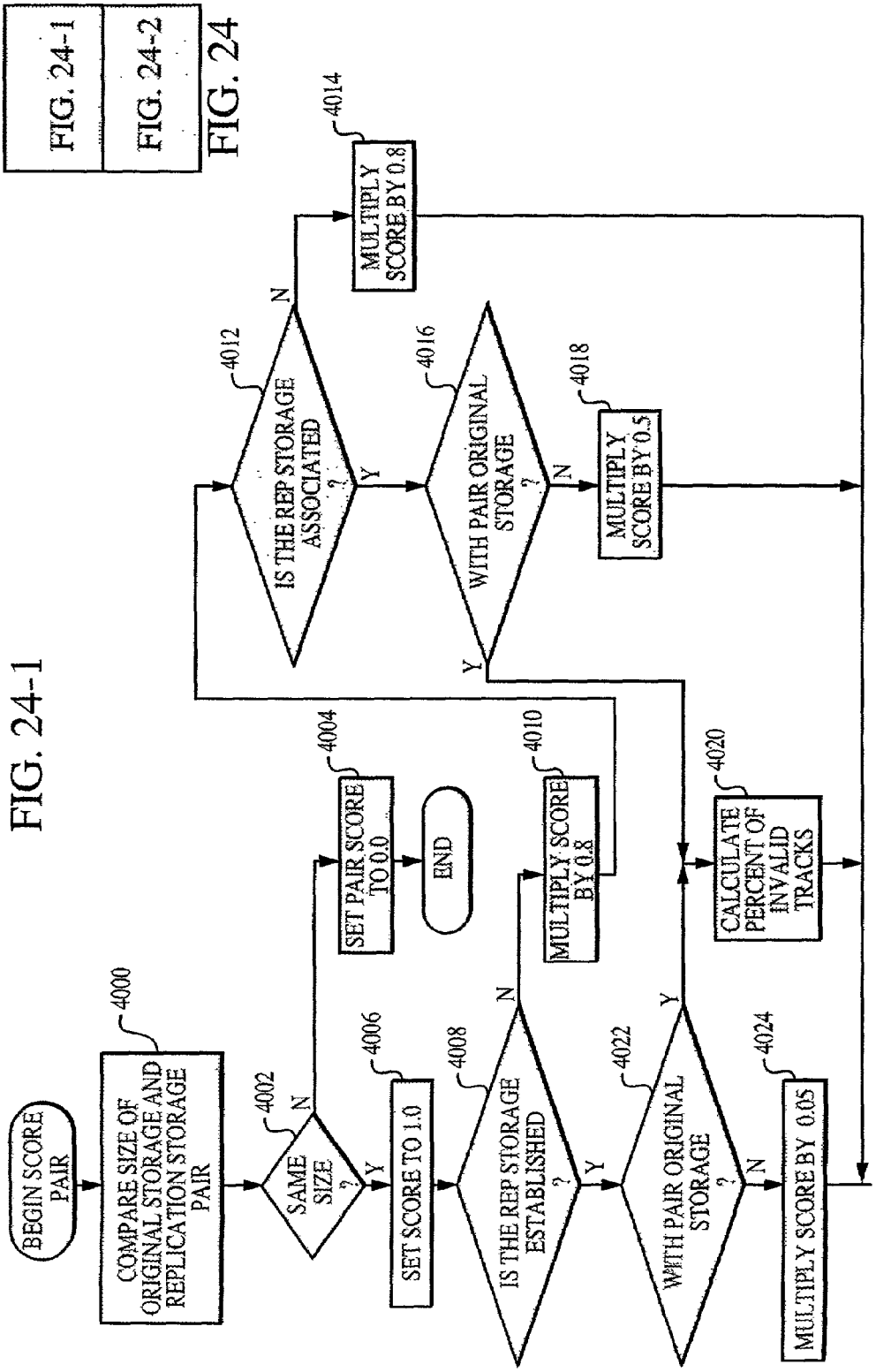
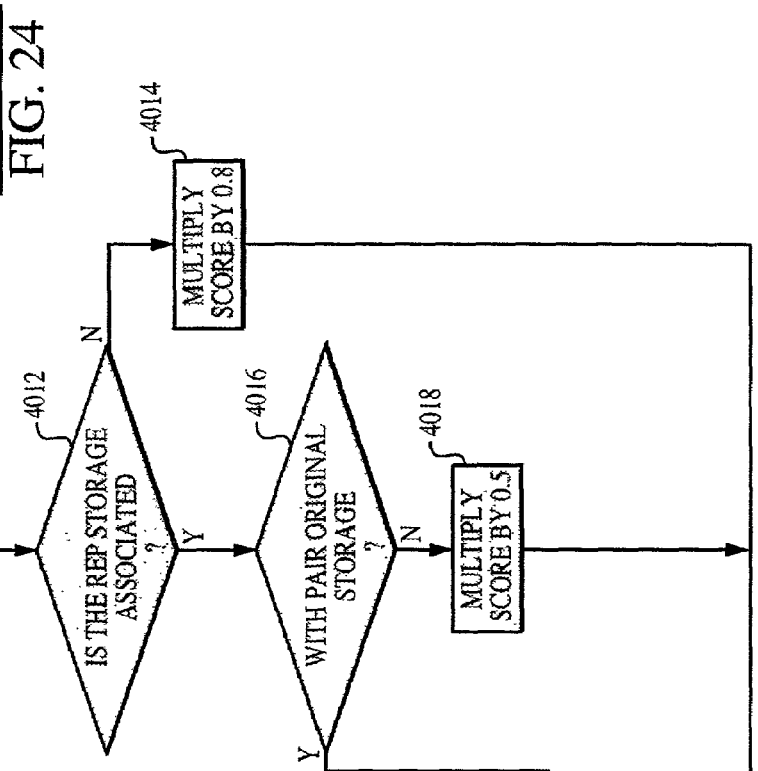
FIG. 24-1
FIG. 24

INFORMATION REPLICATION SYSTEM HAVING AUTOMATED REPLICATION STORAGE

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to data storage and, more particularly, to data replication systems.

BACKGROUND OF THE INVENTION

As is known in the art, computer systems that process and store large amounts of data typically include one or more processors in communication with a shared data storage system in which the data is stored. The data storage system can include one or more storage devices, such as disk drives. To minimize data loss, the computer systems can also include a backup storage system in communication with the primary processor and the data storage system.

Known backup storage systems can include a backup storage device (such as tape storage or any other storage mechanism), together with a system for placing data into the storage device and recovering the data from that storage device. To perform a backup, the host copies data from the shared storage system across the network to the backup storage system. Thus, an actual data file can be communicated over the network to the backup storage device.

The shared storage system corresponds to the actual physical storage. For the host to write the backup data over the network to the backup storage system, the host first converts the backup data into file data, i.e., the host retrieves the data from the physical storage system level, and converts the data into application level format (e.g. a file) through a logical volume manager level, a file system level and the application level. When the backup storage device receives the data file, the backup storage system can take the application level data file, and convert it to its appropriate format for the backup storage system. If the backup storage system is a tape-based device, the data is converted to a serial format of blocks or segments.

The EMC Data Manager (EDM) is capable of such backup and restore over a network, as described in numerous publications available from EMC of Hopkinton, Mass., including the EDM User Guide (Network) "Basic EDM Product Manual." An exemplary prior art backup storage architecture in which a direct connection is established between the shared storage system and the backup storage system is described in U.S. Pat. No. 6,047,294, assigned to assignee of the present invention, entitled Logical Restore from a Physical Backup in Computer Storage System, and incorporated herein by reference.

For large databases, tape-based data backup and restore systems, which are well known in the art, can be used. In general, files, databases and the like are copied to tape media at selected times. Typically, data is periodically backed up to prevent the loss of data due to software errors, human error, hardware failures. Upon detection of an error, in an online database, for example, the backed up data can be restored to effect recovery of the data. While restore refers to obtaining backed up data, data recovery refers to the entire process in which applications can access and use the retrieved data. Transactions since the time of backup can be recreated using so-called redo logs.

Tape-based backup and restore systems have a number of disadvantages. For example, due to the significant amount of time and overhead associated with backing up and restoring data to tape, such operations are performed relatively infrequently. The longer the period between backup and restoration, the more complicated and time consuming the overall recovery process becomes since, for example, this may render it more difficult to determine the point at which an error occurred. In addition, improvements in the data restore process, such as faster tape access times, provide only incremental advances in the overall data recovery process.

Further, data on tape cannot be accessed until it is restored to disk. Only when the data has been restored can a host computer examine the data. The data must be reformatted for each transition between tape and disk, which requires significant processing resources and elapsed time.

A further disadvantage associated with tape-based data storage systems is associated with the data recovery process itself. For example, after an error has occurred an operator, such as a database administrator, evaluates the error in an attempt to find a correct the error. However, the administrator has to deal with limitations imposed by the nature of tape-based storage. For a large mission critical database, it can be prohibitively expensive to shut down the database and perform a restoration from tape. If all possible, the administrator will attempt to perform a repair of the database. However, the risks of corrupting the entire database, causing additional errors, and failing to remedy the error, are significant.

In addition, it is not always known at what time the database became corrupted. In the case where data must be restored from tape, correction of the error can be an iterative and time-consuming process. The administrator may select a first set of tapes for restoration, after which the database can be examined to determine if the error is corrected. If it is not, another set of tapes, which is typically an earlier backup, must be restored. Data examination steps are then performed until the error is corrected.

Once the error is corrected, the error may be re-introduced into the database as post backup transactions are added to the database from the redo logs. The point at which the error occurs must be identified. The time and effort associated with iterative tape restores and error identification can be quite substantial.

One known attempt to identify errors includes so-called data scrubbing tools. These tools, which can be run periodically, are used in an endeavor to detect errors as soon as possible. While such tools may detect errors, many production databases, like those used by Internet-based vendors, are mission critical and cannot handle the loading required by such tools. In many applications, data scrubbing tools are not a practical option.

In addition, there are times at which it is desirable to recover only a portion of a database. However, known systems do not readily enable recovery of less than the entire database. While a portion of a database may be possible in conventional data backup and restore systems, a high level of skill is required to manually recover a portion of a database.

Furthermore, storage selection in known systems is typically done manually, which requires a high level of expertise to choose storage so as to prevent significant performance problems.

It would, therefore, be desirable to overcome the aforesaid and other disadvantages.

SUMMARY OF THE INVENTION

The present invention provides a data recovery system having mountable data volume replications that significantly enhance error detection and correction in comparison to conventional data backup systems. While the invention is primarily shown and described in conjunction with recovering databases, it is understood that the invention is applicable to other systems in which it is desirable to detect and remove errors from stored data.

In one aspect of the invention, an information recovery system replicates one or more original data volumes to examine the integrity of the replicated or original data volumes. Upon detecting an error, the system can be used to correct the error by repair and/or data restoration. After successful error detection, the data volumes still having the error can then be corrected.

In a further aspect of the invention, an information recovery system provides mounting of partial database replications, such as one or more selected table spaces. With this arrangement, a user can select tablespaces for recovery from a replication of an original database. In one embodiment, the partial mounting can be started in a variety of modes.

In another aspect of the invention, an information recovery system provides automated replication storage selection. With this arrangement, the information recovery system automatically discovers potential storage locations that can be used to replicate an existing data volume, such as a database, and selects storage meeting predetermined requirements so as to obviate the need for a database administrator to manually identify the storage. While the invention is primarily shown and described in conjunction with replicating databases to disk, such as Oracle databases, it is understood that the invention is applicable to storage systems in general in which it is desirable to backup digital information on various replication technologies for subsequent restoration.

In one embodiment, an IR server obtains a list of potential replication storage locations, e.g., BCVs, production data volumes, e.g., standard volumes, that have been requested to be replicated. A user can specify that certain BCVs must have specified criteria, such as BCV storage previously configured by the user. The system then selects potential BCVs for each standard volume and evaluates each standard/BCV pair. In one embodiment, a pair score is determined based upon the level of resource contention, e.g., disk spindle, bus, etc., for the standard/BCV pair. The resources can be weighted to reflect the level of performance degradation due to contention on the resource. A group score is determined from the pair scores for evaluation of whether an acceptable storage solution has been found.

In another aspect of the invention, an information recovery system provides automated replication storage selection. With this arrangement, the information recovery system automatically discovers potential storage locations that can be used to replicate an existing data volume, such as a database, and selects storage meeting predetermined requirements so as to obviate the need for a database administrator to manually identify the storage. While the invention is primarily shown and described in conjunction with replicating databases to disk, such as Oracle databases, it is understood that the invention is applicable to storage systems in general in which it is desirable to backup digital information on various replication technologies for subsequent restoration.

In one embodiment, the IR server obtains a list of potential storage locations, e.g., BCVs, checkpoints, for data volumes, e.g., standard volumes, that have been requested to be replicated. A user can specify that certain BCVs must have specified criteria, such as BCV storage previously configured by the user. The system then selects potential BCVs for each standard volume and evaluates each standard/BCV pair. In one embodiment, a pair score is determined based upon the level of resource contention, e.g., disk spindle, bus, etc., for the standard/BCV pair. The resources can be weighted to reflect the level of performance degradation due to contention on the resource. A group score is determined from the pair scores for evaluation of whether an acceptable storage solution has been found.

It is understood that certain terminology, such as BCV, standard volume, and others, are used to facilitate an understanding of the invention and should not be construed to limit the invention.

BRIEF DESCRIPTION OF THE DRAWINGS

The invention will be more fully understood from the following detailed description taken in conjunction with the accompanying drawings, in which.

DETAILED DESCRIPTION OF THE INVENTION

In general, the information recovery system of the present invention provides users with the ability to make replications of logical objects, such as databases and mail systems, and to restore the replicated objects instantly, i.e., as fast as the underlying storage technology supports. While the invention is primarily shown and described in conjunction with an exemplary storage technology known as Symmetrix by EMC Corporation of Hopkinton, Mass., it is understood that the invention is applicable to a variety of storage technologies and operating systems.

In one particular embodiment, the information restore system targets various databases, such as Oracle and SQL Server databases. The system enables users to configure a database, or portion thereof, e.g., one or more table spaces, for replication. The configured portion of the database is referred to a replication object (RO). That is, the RO describes the application to be replicated. For each RO, one or more Activities describe how the replication of the RO should be performed. Exemplary information includes how to interact with the database, e.g., online or offline, pre and post scripts, mounting and recovery options, and storage selection criteria. Activities can be run on demand or scheduled for predetermined times. Mounting details, e.g., where and how, can be defined during activity creation.

Storage for the activity can be selected by the system in a variety of ways. For example, the system can look for free or previously established storage business continuance volumes (BCVs). As used herein, business continuance volumes refer to a mirror of a standard volume a part of the database. Also, users can define attributes on BCVs to create storage pools and select storage by attributes in the activity. The user can also explicitly assign BCVs to Standard Devices (STDs).

Figure 1:
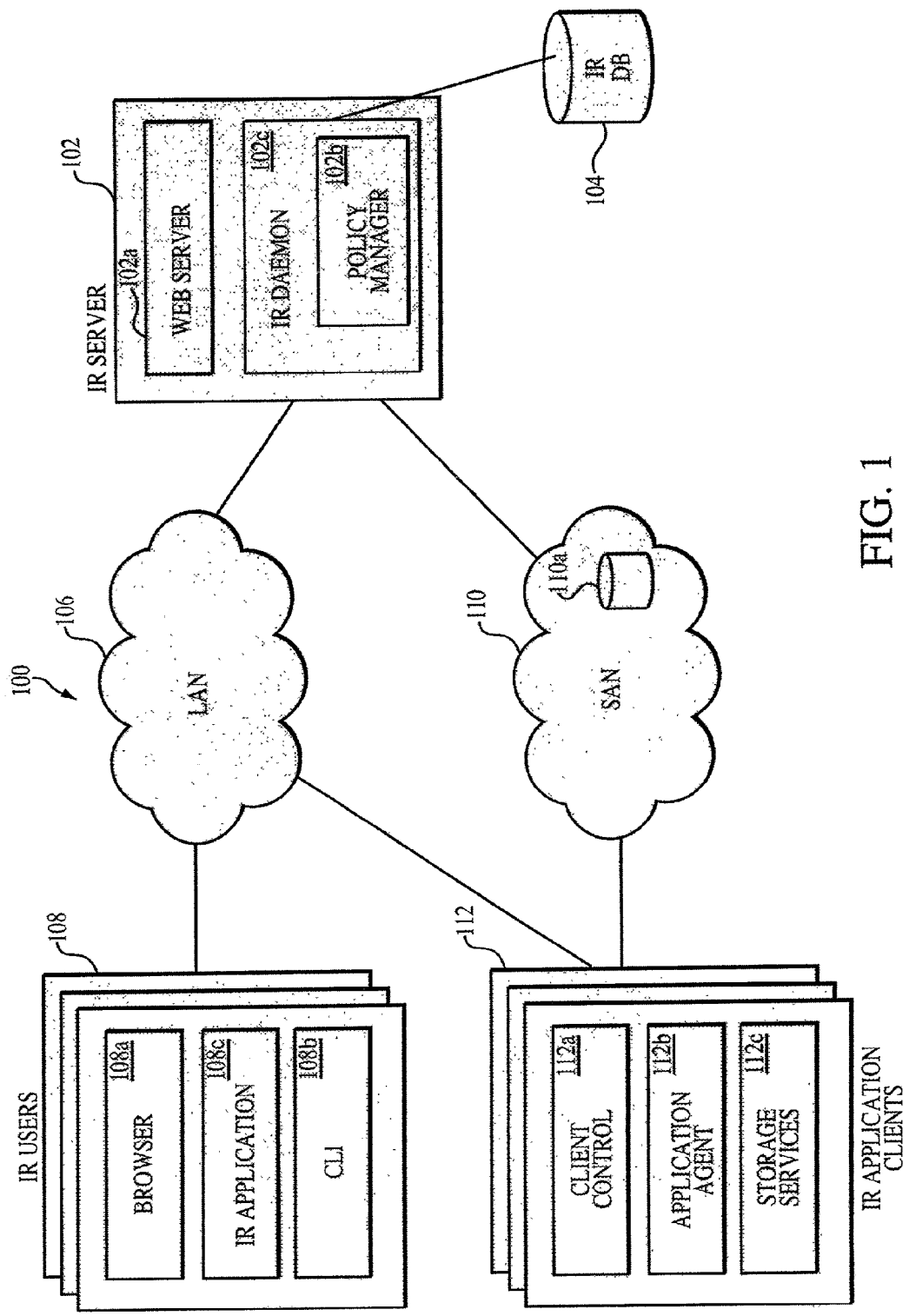
FIG. 1 is a schematic depiction of an information recovery system in accordance with the present invention.

FIG. 1 shows an exemplary information restore system 100 in accordance with the present invention. An IR server 102, which includes persistent storage 104, handles activity requests from IR users on desktop machines 108. A web server 102a provides an interface to a Local Area Network (LAN) 106, for example, to enable communication with user desktop machines 108, which can include a user interface, e.g., browser 108a and/or command line interface (CLI) 108b, and an IR application 108c. The IR server 102 can also include an IR replication policy manager 102b within an IR daemon 102c for controlling and coordinating replication activity for storage units 110a within a storage area network (SAN) 110 that are visible to the respective application hosts. The IR server 102 can include a replication policy manager or engine 102b for each supported replication technology to implement decisions regarding what storage to use for a given replication. In one embodiment, the policy engine 102b is provided as a dynamic library that is linked with the IR Daemon. Static state information about existing replications and the corresponding storage is stored in the IR database 104, which can be provided as an SQL Server database.

The system 100 further includes application hosts 112, e.g., Oracle database server hosts, that are under client control 112a via an application agent 112b and storage service module 112c. The application agent 112b in the IR application client processes user databases, which reside in the storage area network 110. This client control module 112a, which can be provided as a daemon, handles and dispatches client operations. Application agents 112, e.g., plug-ins, for each supported application handle work requests. The IR application clients 112 can also communicate with third party vendors via call outs, for example, for driving a third party product to backup a replication of the user database. It is understood that hosts that are used for mounting replications can also be application hosts 112.

While shown as three separate hosts, it is understood that one or more of the user, application client and IR server can reside on a single host or machine. It is further understood that the illustrated embodiments, architectures and configurations can be readily modified by one of ordinary skill in the art to meet the requirements of a particular application without departing from the present invention.

Figure 2:
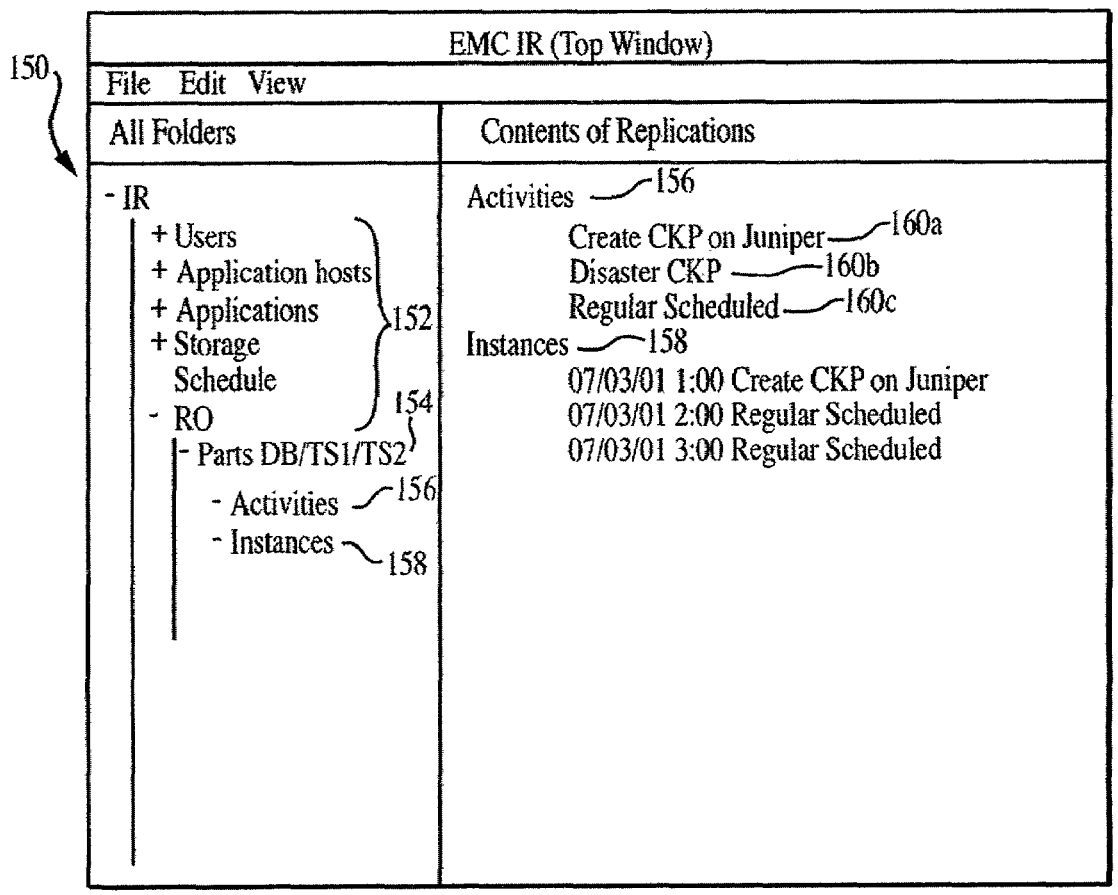
FIG. 2 is pictorial representation of an exemplary screen display for the system of FIG. 1.

FIG. 2 shows an exemplary screen display 150 of an IR control panel for an information recovery system in accordance with the present invention. The display 150 can include a hierarchy of objects 152 in the IR system, such as users, application hosts, applications, storage, the schedule, and replication objects (ROs). In the illustrative display, a replication object named "Parts DB/TS1/TS2" 154 is expanded to show Activities 156 and Instances 158 of this replication. The Activities include "Create CKP on Juniper" entry 160a, "Disaster CKP" entry 160b, and "Regular Scheduled" entry 160c. The Instances 158 show the checkpoints or replications that have been created for the RO.

In general, hosts and applications become visible to the system upon installation. When hosts and applications are installed, they are registered in the IR daemon database.

Figure 3:
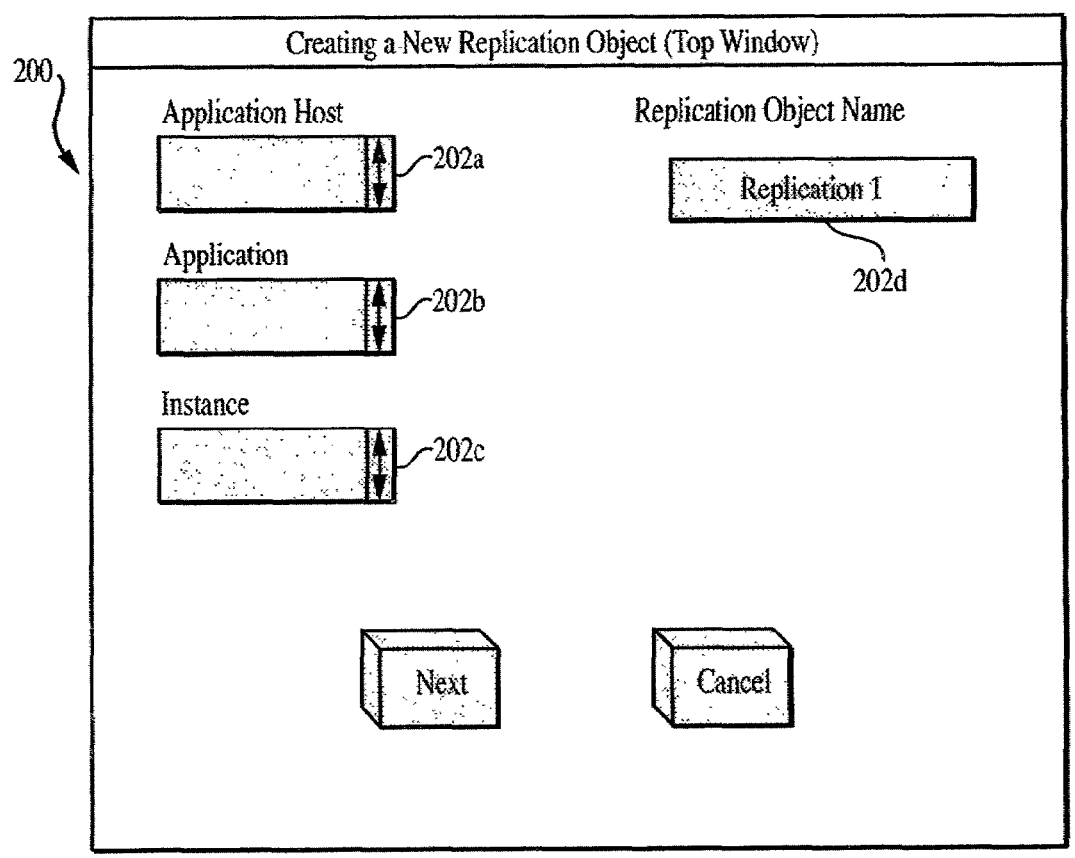
FIG. 3 is a pictorial representation of a further exemplary screen display for the system of FIG. 1.

FIG. 3 shows an illustrative screen display 200 for creating new replication objects (ROs). To create a new replication object, the user activates a pull down menu and selects "File," "New," and "Replication Object" to reach the new RO display 200. The user then specifies the application host in the application host field 202a and application in application field 202b to be configured based upon information from the IR Daemon database of installed application hosts. For a given host and application, each instance of the application can be displayed in an instance field 202c. The user selects an instance and assigns a name to the new replication object in the name field 202d.

Additional screen displays (not shown) can query the user for additional information. For example, a further screen display can prompt the user for application specific information about the replication object, such as how to access the database (username and password), as well as what portions of the database to backup, e.g., an entire database, tablespaces for an Oracle database, etc. Another screen display enables the user to create activities for the RO. There can be many activities that can be run individually or scheduled for specific times. More particularly, an activity can provide regularly scheduled replications, make a decision support database, and support disaster recovery.

In one embodiment, a replication or checkpoint has an expiration time, i.e., how long the replication remains valid. The user can indicate whether it is anticipated that the checkpoint (replicated database) will be mounted. This information may be required when choosing a replication technology (RT), since not all replication technologies allow mountable copies of the checkpoint. The user, when defining storage selection, can choose a replication technology or allow the system to select the RT, as mentioned above.

In addition, for each activity the user can provide attributes that are specific to mount, storage and application. Mount attributes define what should be done with the object when it is mounted, such as recovering the database, running a verify program, and doing a tape backup. Storage attributes define what storage should be used to make the replication. Application attributes define when the replication is made and what application specific things need to be done, such as putting the database in on-line backup mode, and using a user script to shut the database down.

Selecting the mount options for the replication object allows the user to specify things that should be done with a replication after it is taken. This same set of options can be displayed to the user if the user manually chooses to mount a replication. One option the user has is whether to mount and restore the replication, and where to make it visible. Running an activity can include mounting the replication, which can be fully or partially mounted.

After selecting how the application should be mounted, the user can choose what to do with the application, such as choosing which programs to run, running a backup and mounting the application after completion. Multiple programs or backups can be selected for execution. Unmounting involves bringing the application down and removing any storage references that were created to make the replication visible on the target operating system.

Storage can be made explicitly known to the IR system either by assigning attributes to it or by explicitly associating standards with replication storage. In one particular embodiment, in the define attributes storage screen, the user is presented with a list of BCVs that were discovered on the data storage device, e.g., Symmetrix, attached to the client machines. The user can then select one or more BCVs and assign attributes to them.

Figure 4:
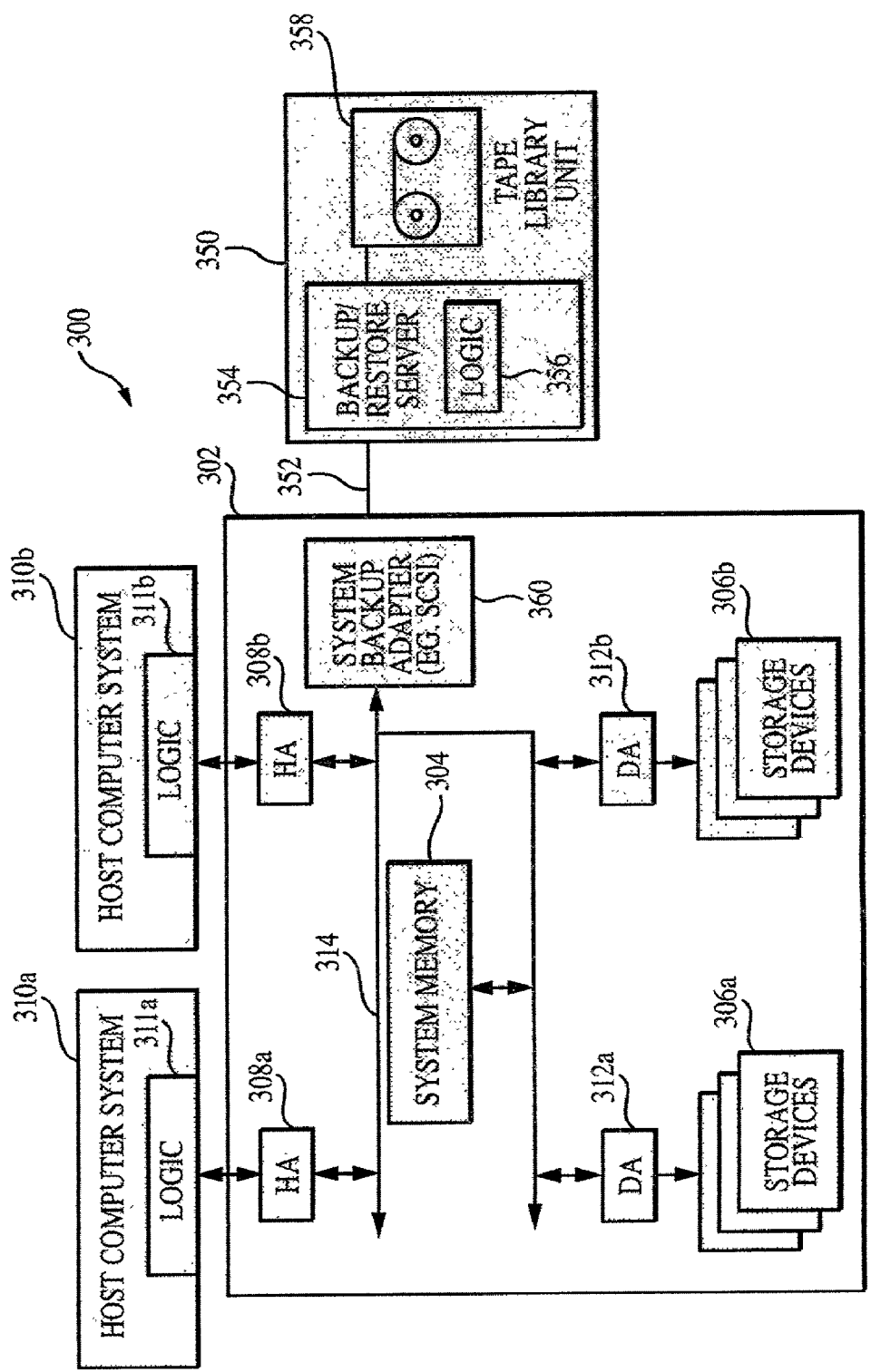
FIG. 4 is a schematic block diagram of a data storage network that can form a part of the system of FIG. 1.

FIG. 4 shows further details of an information recovery system 300 including a data storage system 302 in accordance with the present invention. In one embodiment, the data storage system 302 (which can be located within the storage area network 110 of FIG. 1) can be based upon a Symmetrix Integrated Cache Disk Array system available from EMC Corporation of Hopkinton, Mass. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC, the assignee of this invention and each of which is hereby incorporated by reference.

In general, a local volume is replicated to a business continuance volume (BCV). A local system that employs mirroring allows access to production volumes while performing backup is also described in the '497 patent incorporated herein. The data storage system 302 includes a system memory 304 and sets or pluralities of multiple data storage devices or data stores 306a,b. In an exemplary embodiment, the system memory 304 includes a buffer or cache memory. The storage devices 306 can comprise disk storage devices, optical storage devices and the like. However, in an exemplary embodiment the storage devices are disk storage devices. The storage device 306 represent an array of storage devices in any of a variety of known configurations.

Host adapters (HA) 308a,b provide communications between host systems 310a,b and the system memory 304 and disk adapters (DA) 312,a,b provide pathways between the system memory 114 and the storage device sets 306a,b. A bus 314 interconnects the system memory 304, the host adapters 308 and the disk adapters 312. Each system memory is used by various elements within the respective systems to transfer information and interact between the respective host adapters and disk adapters.

An optional backup storage system 350 can be connected to the data storage system 302. The backup storage system can be provided as an EMC Data Manager (EDM) connected to the data storage system as described in Symmetrix Connect User Guide, P/N 200-113-591, Rev. C, December 1997, available from EMC Corporation. The direct connection between the shared storage system and the backup storage system may be provided as a high-speed data channel 352 such as a SCSI cable or one or more fiber-channel cables. In this system, a user may be permitted to backup data over the network or the direct connection.

The backup system 350 includes a backup/restore server 354, logic 356 as part of the server, and a tape library unit 358 that may include tape medium (not shown) and a robotic picker mechanism (also not shown) as is available on the preferred EDM system.

In general, the data storage system 302 operates in response to commands from the host systems 113 via the host adapters 308. The host adapters 308 transfer commands to a command buffer that is part of system memory 304. The command buffer stores data structures and write requests that the disk adapters generate. The disk adapters 312 respond by effecting a corresponding operation using the information in a command buffer. The selected disk adapter then initiates a data operation. Reading operations transfer data from the storage devices 306a,b to the system memory 304 through a corresponding disk adapter 312a,b and subsequently transfer data from the system memory 304 to the corresponding host adapter 308*a*,*b* when the host system 113 initiates the data writing operation.

It is understood that the computer host systems 310 may be any conventional computing system, each having an operating system, such as systems available from Sun Microsystems, and running the Solaris operating system (a version of Unix), an HP system running HP-UX (a Hewlett-Packard client, running a Hewlett-Packard version of the Unix operating system) or an IBM system running the AIX operating system (an IBM version of Unix) or any other system with an associated operating system such as the WINDOWS NT operating system. The storage system may be any conventional storage system, including a Symmetrix storage system, as described above.

A short description of concepts useful for understanding this invention and known in the art is now given. A physical disk is formatted into a "physical volume" for use by management software, such as Logical Volume Manager (LVM) software available from EMC. Each physical volume is split up into discrete chunks, called physical partitions or physical extents. Physical volumes are combined into a "volume group." A volume group is thus a collection of disks, treated as one large storage area. A "logical volume" consists of some number of physical partitions/extents, allocated from a single volume group. A "filesystem" refers to a structure or a collection of files.

Below is a short description of other useful terminology which may be understood in more detail with reference to the incorporated '497 patent. When a mirror is "established" the data storage system 119 creates a mirror image (copy or replication) of a source or standard volume. When using the preferred Symmetrix such a mirror is denoted as a business continuance volume (BCV), also referred to in general terms as a mirrored disk, and in such a context as a BCV device. If data on the standard volume changes, the same changes are immediately applied to the mirrored disk.

When a mirror is "split" the Symmetrix data storage system isolates the mirrored version of the disk and no further changes are applied to the mirrored volume. After a split is complete, the primary disk can continue to change but the mirror maintains the point-in-time data that existed at the time of the split. Mirrors can be "synchronized" in either direction (i.e., from the BCV to the standard or visa versa). For example, changes from the standard volume that occurred after a split to the mirror can be applied to the BCV or mirrored disk. This brings the mirrored disk current with the standard volume. If synchronized in the other direction, the primary disk can be made to match the mirror. This is often the final step during a restore.

The operation of a BCV device and its corresponding BCV volume or volumes is more readily understood in terms of data sets stored in logical volumes and is useful for understanding the present invention. Any given logical volume may be stored on a portion or all of one physical disk drive or on two or more disk drives.

Figure 5:
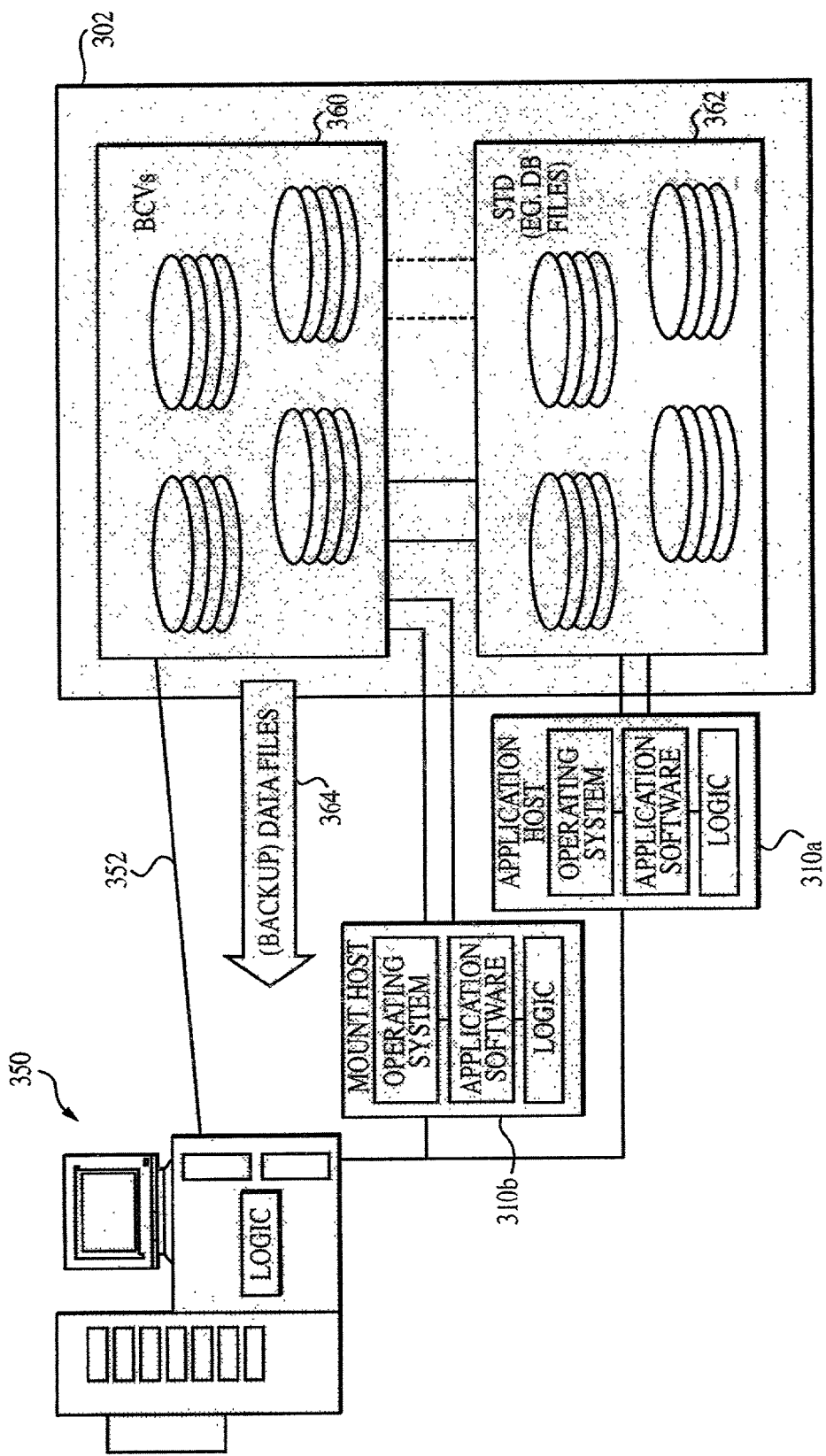
FIG. 5 is a schematic representation showing further details of a data storage network.

Referring to FIG. 5, in this particular embodiment, operations on a series of physical disks are controlled in terms of logical volumes. The segmentation or hypering of physical disks into logical volumes is well known in the art. A disk adapter (not shown) interfaces logical volumes 360 interface to the data storage system bus. Each of these volumes 360 is defined as a Business Continuation Volume and is designated a BCV device. Each BCV device comprises a standard disk controller and related disk storage devices configured to independently support applications and processes. The use of these BCV devices enables a host such as host 310*a*, described from here on as the "source" host computer system to utilize instantaneous copies of the data in the standard volumes 362. In a conventional operation, there typically will be at least one BCV volume assigned to each host device that will operate on a data set concurrently. However, as will be explained below, the BCV volumes established for use by one host may be used by another host, such as host 310*b*, described from here on as the "target" host computer system.

The source host 310*a* may continue online transaction processing (such as database transaction processing) or other processing without any impact or load on the standard volumes 362, while their respective mirror images on the BCVs 360 are used to back up data in cooperation with backup system 302. However, the BCVs may be established for use on another host substantially automatically under control of a computer program, rather than requiring intervention of an operator all along the way.

The direction of data flow for backup is from the data storage system 302 to the backup system 350 as represented by arrow 364. The direction of data flow for restore is to the data storage system is in the opposite direction), but the BCVs 360 may be mounted on another host other than the one originally established in accordance with the method of this invention.

The optional backup system 350, such as the EDM system, offers several options for controlling mirror behavior before and after a backup or restore. Mirror policies are well known to one of ordinary skill in the art. Exemplary pre-backup mirror options include bring mirrors down, verify mirrors are down, bring mirrors down if needed, and bring mirrors down after establishing and post backup mirror options include bring mirrors up, leave mirrors down, and leave mirrors as found.

The system establishes one or more mirrored copies of data (BCVs) that are copies of one or more volumes of data (Standard Volumes). The BCVs are established in a conventional manner as described in the incorporated '497 patent. The BCVs are separated or split from the respective one more volumes of data in a conventional manner and which is also described in the incorporated '497 patent.

The system discovers logical information related to the standard volumes that are part of the volume group on the source computer system 310*a*. A map of the logical information to physical devices on the source computer system is created. In one embodiment, the map can be provided as an XML message. Alternatively, the map takes the form of a flat file that may be converted into a tree structure for fast verification of the logical information. That map is used to build a substantially identical logical configuration on the target computer system 310*b*, preferably after the logical information has been verified by using a tree structure configuration of the logical information.

The logical configuration is used to mount a duplicate of the BCVs on the target computer system (denoted as mounted target BCVs). The newly mounted target BCVs then become part of a second volume group on the target computer system 310*b*.

Prior to transferring data, the backup system exercises a series of functions. A discovery/mapping function discovers and maps logical to physical devices on the source host 310*a*, and includes such information as physical and logical volumes, volume groups, and file system information. An establish/split function establishes BCVs or splits such from standard volumes, depending on the pre- and post-mirror policies in effect on source host 310*a*.

A build/mount function exports the BCVs established on the source host 310*a* to the target host 310*b*. It creates volume group, logical volume, and file system objects on the target host computer system.

An optional backup/restore function performs backup of the target host BCV data that has been exported or migrated from the source host. The dismount/cleanup function removes all volume group, logical volume, and filesystem objects from the target host.

Figure 6:
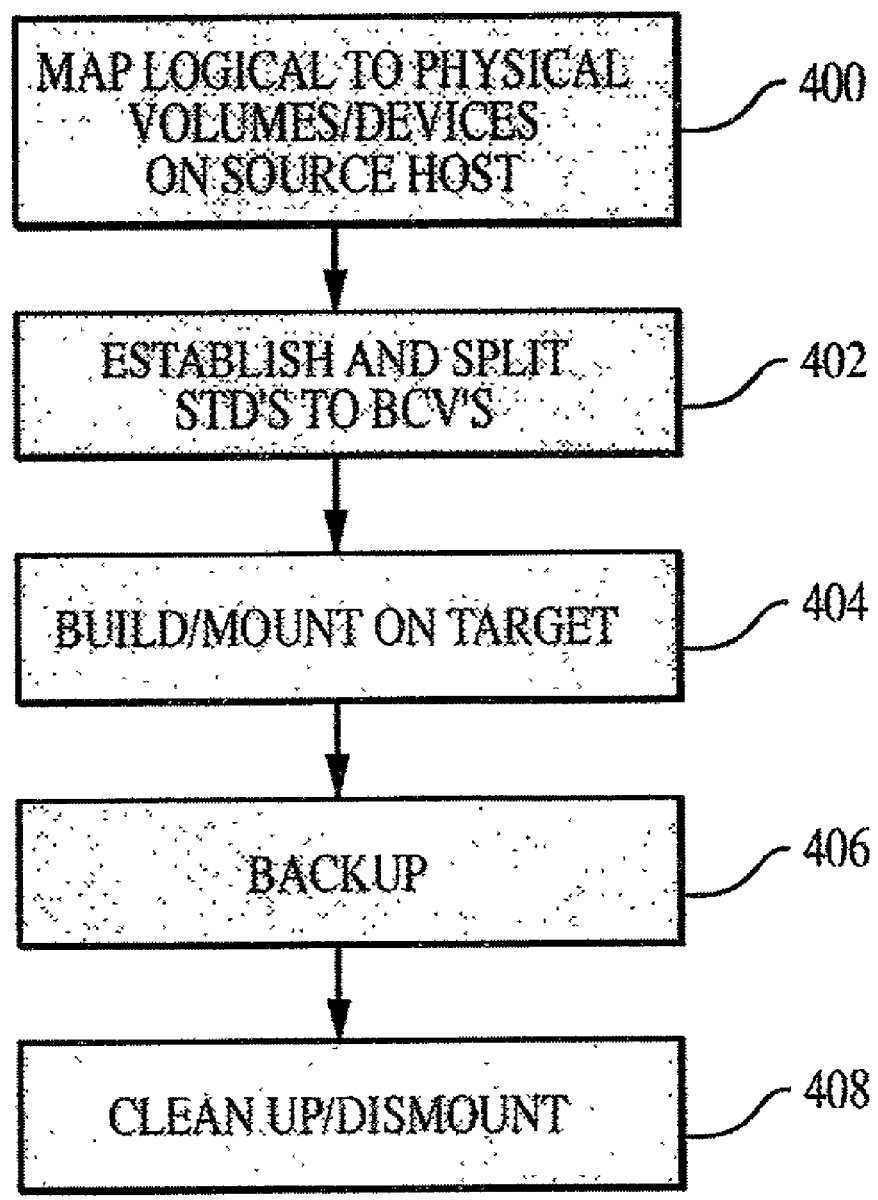
FIG. 6 is a flow diagram showing an exemplary sequence of steps for mapping logical to physical volumes for backup and restore in an information recovery system in accordance with the present invention.

FIG. 6 shows an overview of the overall replication mounting process. In step 400 the system maps logical to physical devices on the source host. In step 402, the logic establishes and subsequently splits standard to BCVs (which may be accomplished by a call to another function on the data storage system) in accordance with the mirror policy in effect at the source host. Step 404, the system builds and mounts on the target host so that the BCV's are exported or migrated to the target host. Step 408 is a cleanup step in which all volume group logical volume, and filesystem objects are removed from the target server.

Figure 7:
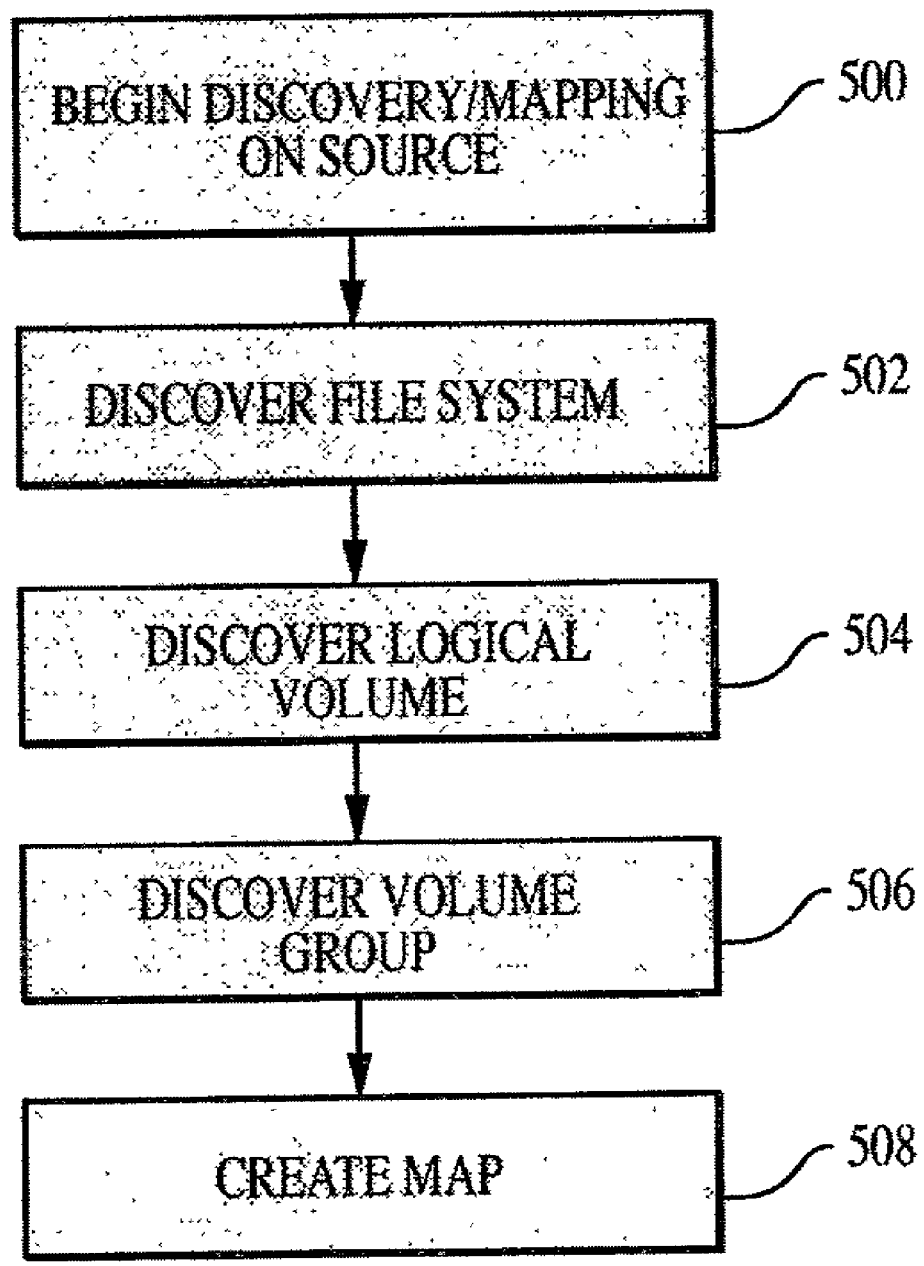
FIG. 7 is a flow diagram showing an exemplary sequence of steps for mapping and discovering volume information in an information recovery system in accordance with the present invention.

FIG. 7 is an overview of the steps of the mapping and discovery process. In step 500, the discovery/mapping process begins on the source host. The filesystem is discovered on the source host in step 502 and the logical volume is discovered in step 504. The volume group information is discovered on the source host in step 506. In step 508, the map can created as a flat file or other relatively efficient data structure for compiling and using the information.

Figure 8:
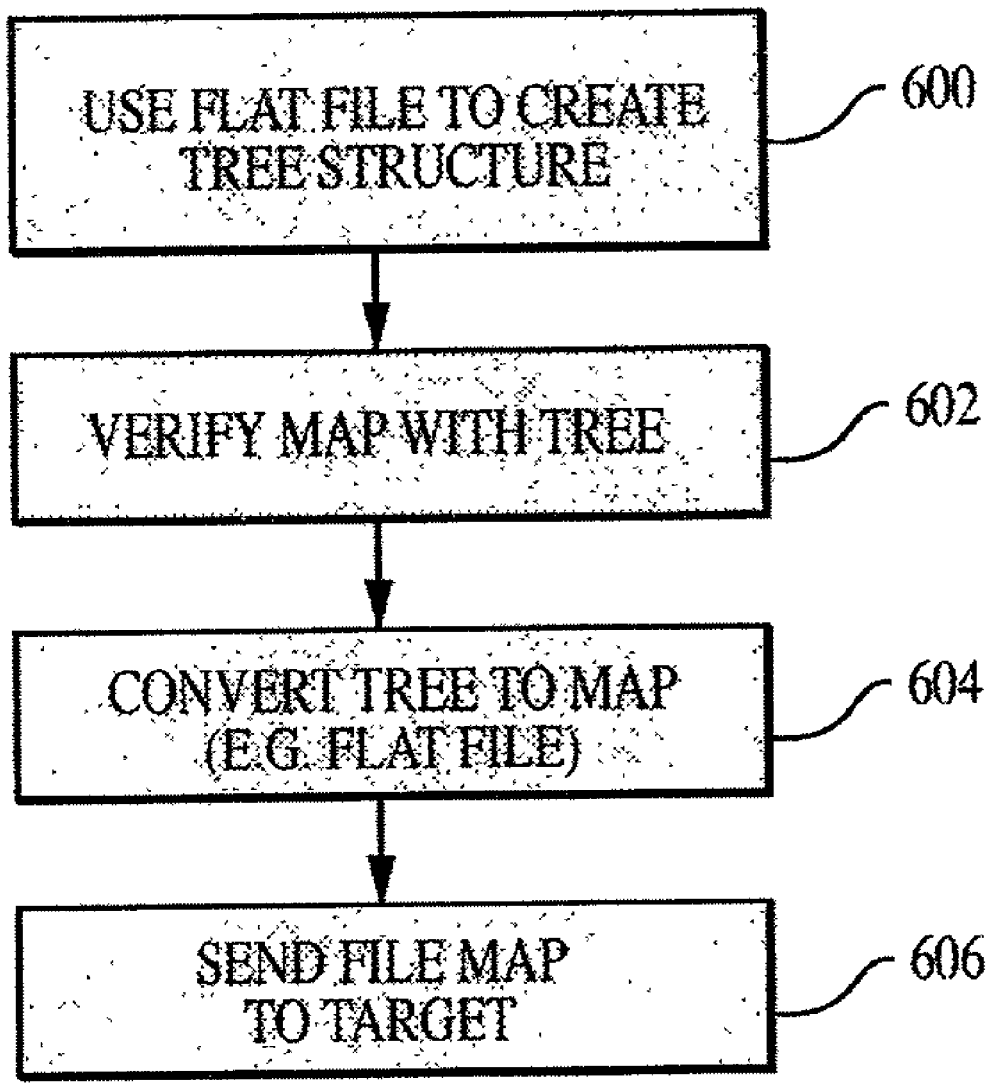
FIG. 8 is a flow diagram showing an exemplary sequence of steps for creating a tree structure from volume information discovered for an information recovery system in accordance with the present invention.

Referring now to FIG. 8, in one embodiment, in step 600 the discovered logical volume information, which can correspond to flat file, is used to create a tree structure. This structure can be built by a unix function call from information in the mapping files described above. It may be built on both the target host computer system and the source host computer system. It is referred to as a tree because the Volume group information may be placed as the root of the tree and the branches represent the device information within the group and the logical volumes within the group. The tree structure is used in step 602 to verify the accuracy of the map file before the map file is sent to the target host. The tree is converted to a map preferably as a flat file in step 604. This flat file map is then sent back to the target in step 606.

Alternatively, discovery is in manner similar to that performed by the EMC Data Manager (EDM), which is well known to one of ordinary skill in the art. In one embodiment, the map is sent as an XML message.

Figure 9:
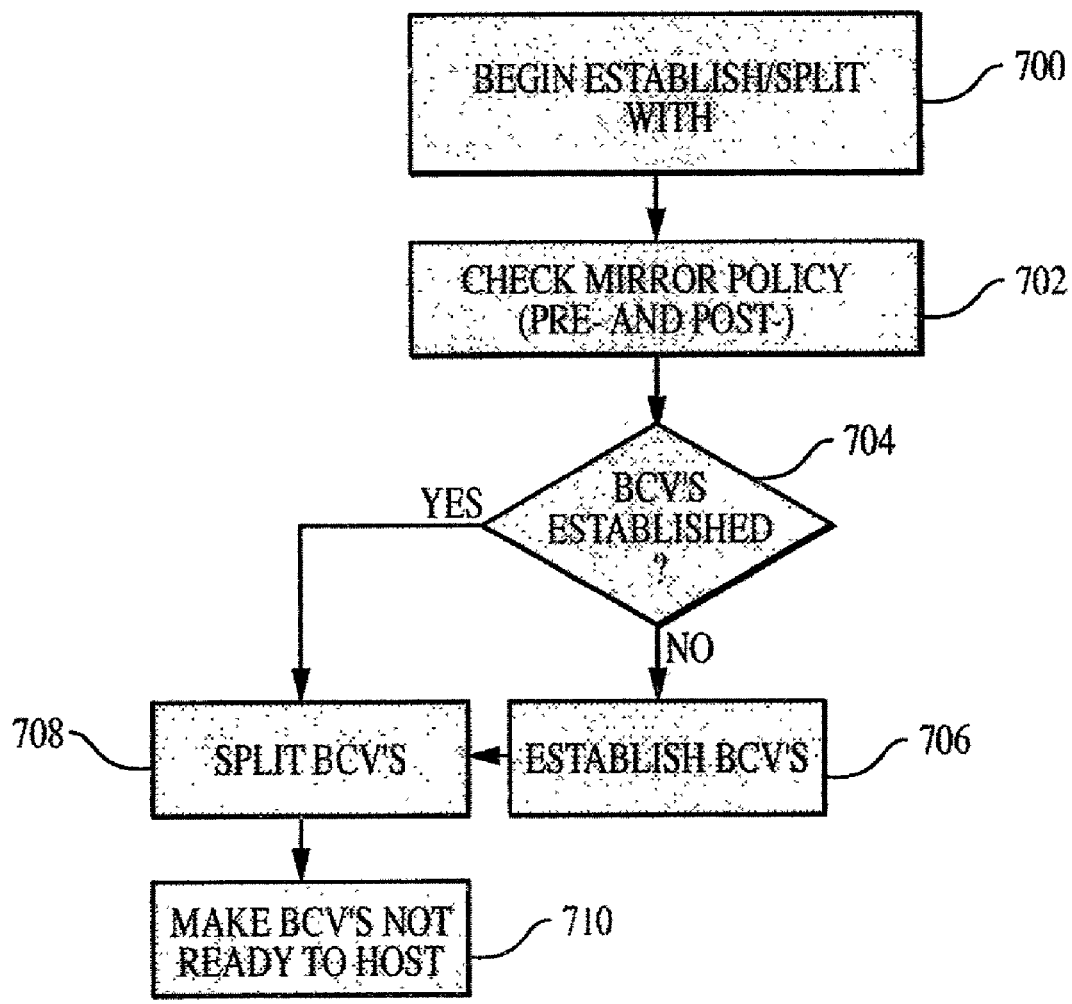
FIG. 9 is a flow diagram showing an exemplary sequence of steps for establishing and splitting mirrors in an information recovery system in accordance with the present invention.

Referring to FIG. 9, the process of establishing/splitting with a backup system is started in step 700. A mirror policy, if any, is checked in step 702. An inquiry is posed in step 704 to determine if BCVs are established in accordance with the mirror policy. If the answer is no then BCVs are established in step 706. The BCVs are split from the source host in step 708. The BCVs are made not ready to the host in step 710.

Figure 10:
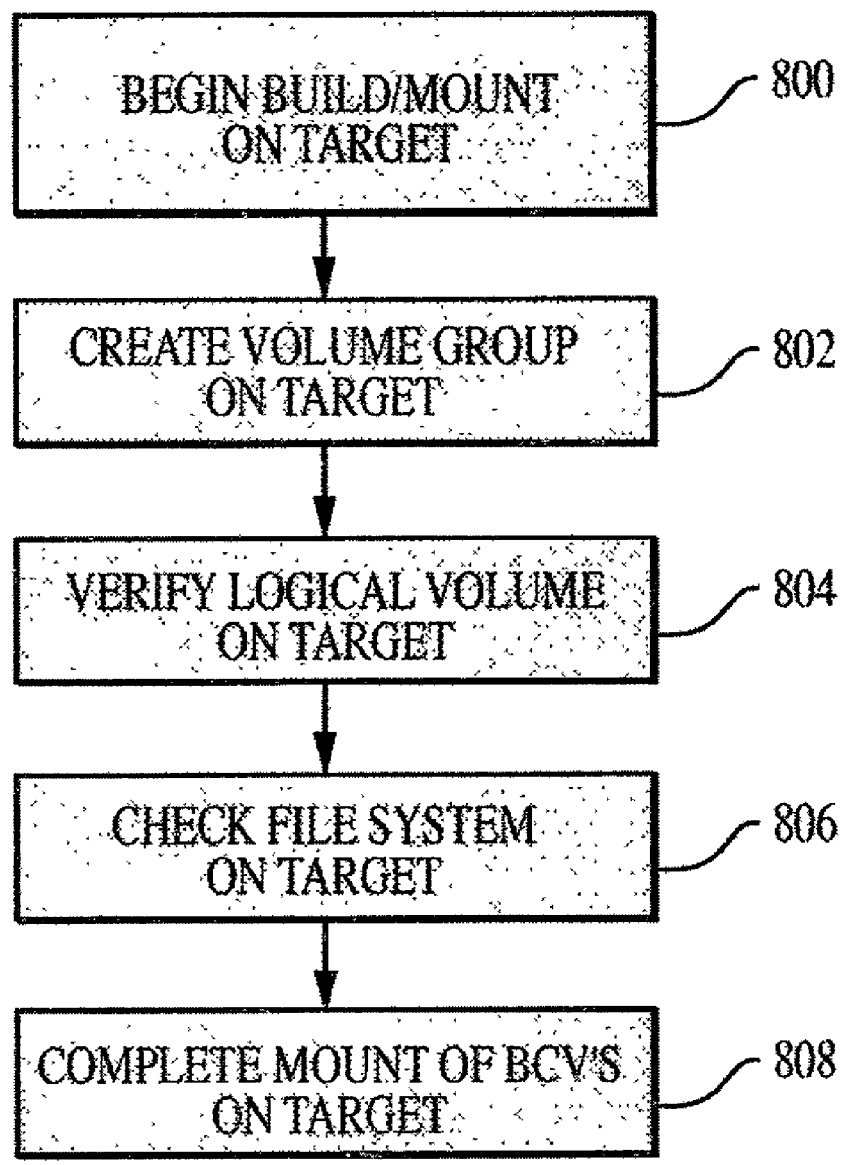
FIG. 10 is a flow diagram showing an exemplary sequence of steps for building/mounting logical information in an information recovery system in accordance with the present invention.

Referring to FIG. 10, the process of beginning to build/mount logical information so the BCVs can be mounted on the target is begun in step 800. The volume groups are created on the target is step 802. Logical volumes are verified on the target in step 804. The filesystem is checked and fired up on the target in step 806. The device mount may now be completed with this logical information related to the BCVs on the target host in step 808.

Figure 11:
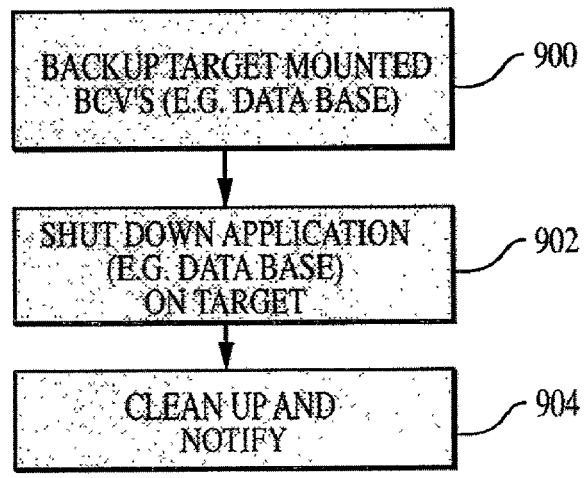
FIG. 11 is a flow diagram showing an exemplary sequence of steps for backing up data volumes in an information recovery system in accordance with the present invention.

As shown in FIG. 11, the newly mounted target BCVs may now be optionally backed up in tape in step 900. The application is then shut down on the target in step 902. And following the backup of the target BCV's cleanup steps and notification take place in step 904.

If the software application on the target host in the source host is a database, then information related to the data may also be backed up, with the effect that essentially the entire database is backed up. Important information from the database includes any transactional data performed by the database operations, and related control files, table spaces, and archives/redo logs.

Regarding databases, further terminology is now discussed. While terminology for an Oracle database is used, one skilled in the art will recognize that other databases may be used without departing from the invention.

Control files contain information about the Oracle database, including information that describes the instance where the datafiles and log files reside. Datafiles may be files on the operating system filesystem. A tablespace is the lowest logical layer of the Oracle data storage structure. The tablespace includes one or more datafiles. The tablespace provides the finest granularity for laying out data across datafiles.

In the database there are archive files known as redo log files or simply as the redo log. This is where all information that may have to be recovered is kept. Without the redo log files a system failure would render the data unrecoverable. When a log switch occurs, the log records in the filled redo log file are copied to an archive log file if archiving is enabled.

Figure 12:
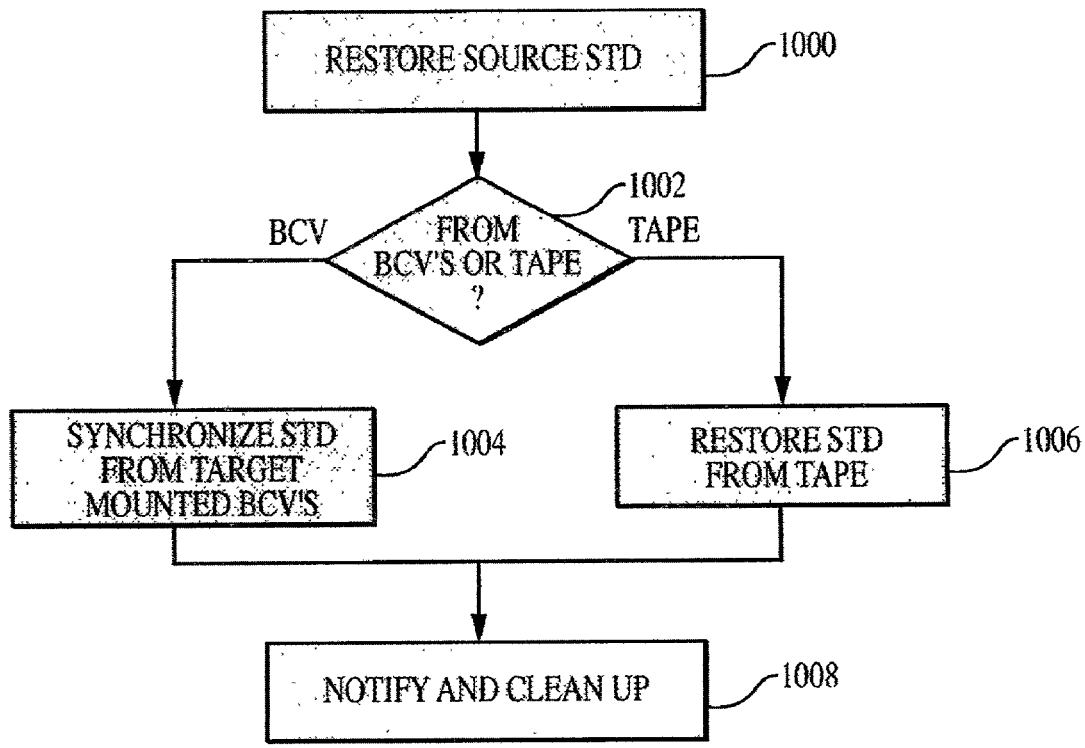
FIG. 12 is a flow diagram showing an exemplary sequence of steps for restoring data volumes in an information recovery system in accordance with the present invention.

Referring now to FIG. 12, the process for restoring source standard volumes is shown beginning at step 1000 for the optional backup system. In step 1002, the system poses an inquiry to determine if the restore is to be from the BCVs on the target or somewhere else. In accordance with the answer, the standard volumes are synchronized from the target mounted BCVs or tape, for example, respectively in steps 1004 or 1006. Step 1008 begins the notification and cleanup steps which are generally described in FIG. 11.

Figure 13:
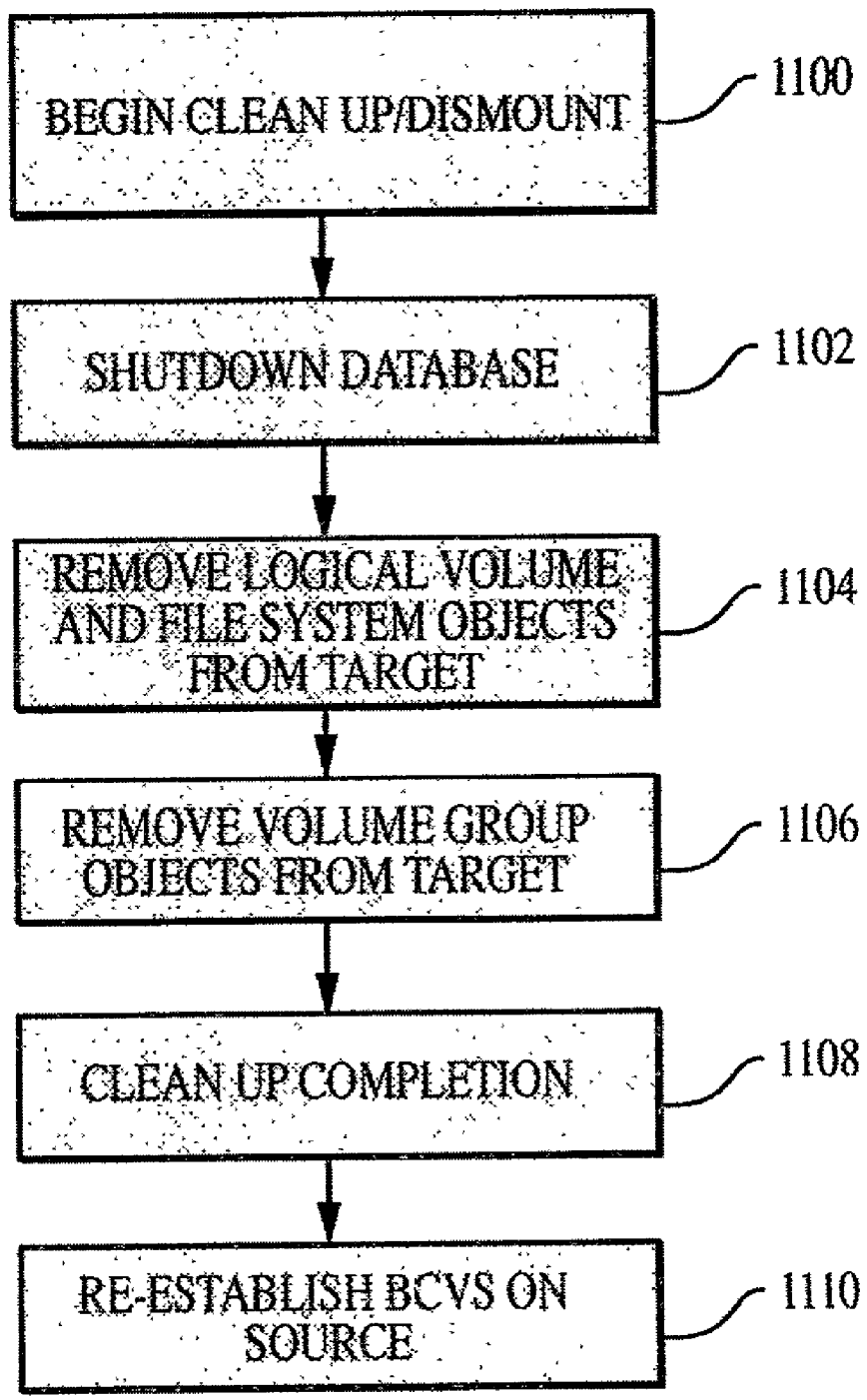
FIG. 13 is a flow diagram showing an exemplary sequence of steps for volume dismount/cleanup in an information recovery system in accordance with the present invention.

The cleanup/dismount process begins in step in 1100 as shown in FIG. 13. The BCVs are dismounted from the target in step 1102. This may be accomplished for example with the UNIX umount command. The objects related to volume group, logical volume, and filesystem or move the target in steps 1104 and 1106. The cleanup is completed in step 1108. The BCVs are re-established on the source (i.e., made ready to the host) in step in 1108.

Figure 14:
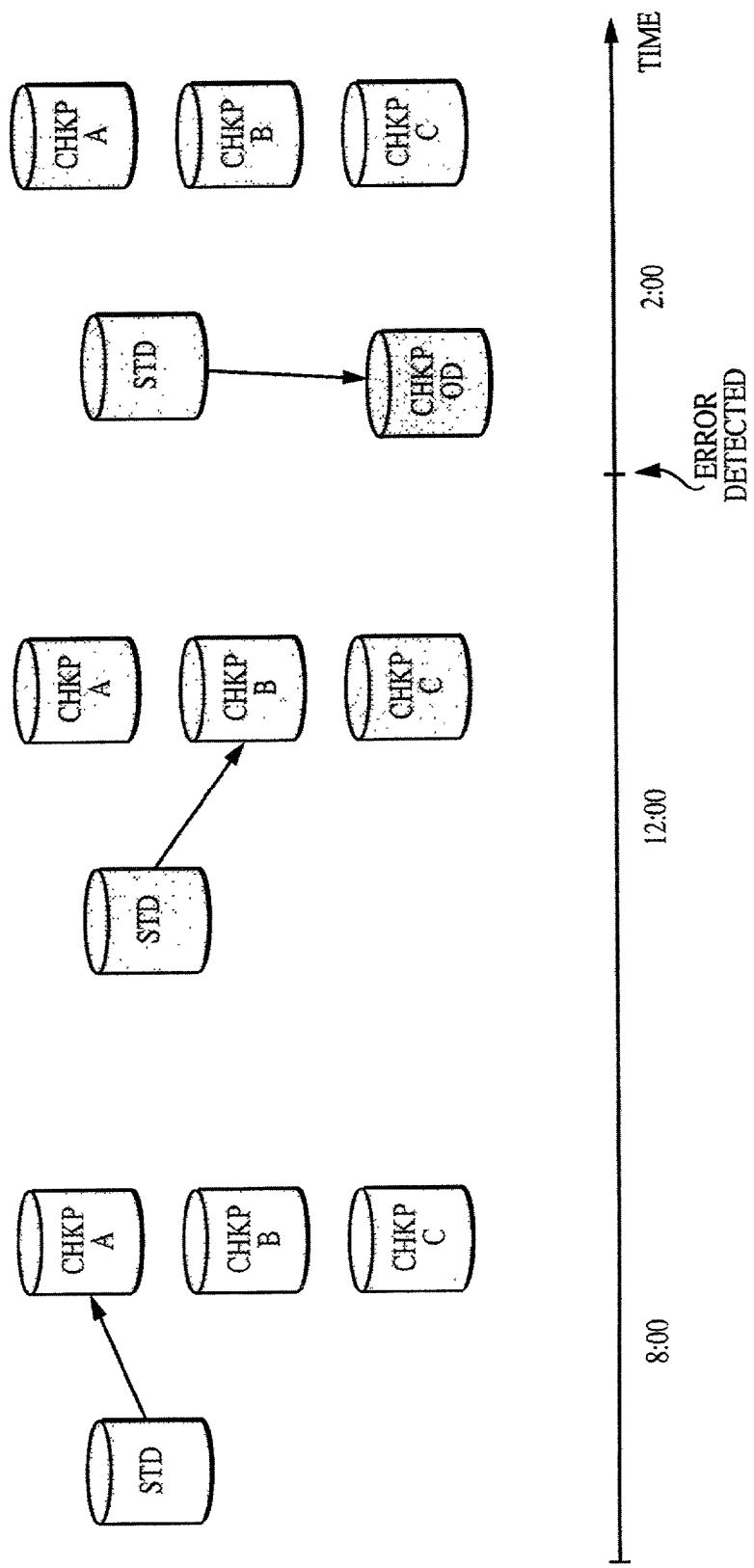
FIG. 14 is a pictorial representation of creating volume checkpoints over time in an information recovery system in accordance with the present invention.

FIG. 14 shows an exemplary checkpoint or replication schedule for an information recovery system in accordance with the present invention. At about 8:00, a standard volume STD, which can contain an Oracle database for example, is replicated on a corresponding BCV CHKP A, as described in detail above. At 12:00, the next scheduled checkpoint occurs at which the standard volume is replicated to a further BCV CHKP B. At about 1:00 an error is detected, such as by a data scrubbing tool, so that at about 2:00, after some evaluation period, the standard volume is replicated to an on demand BCV CHKP OD. The 4:00 checkpoint to the next BCV CHKP C can occur as scheduled provided the error is corrected and the standard volume STD up to date. Further on demand checkpoints can be made as desired, as described above.

Figure 15:
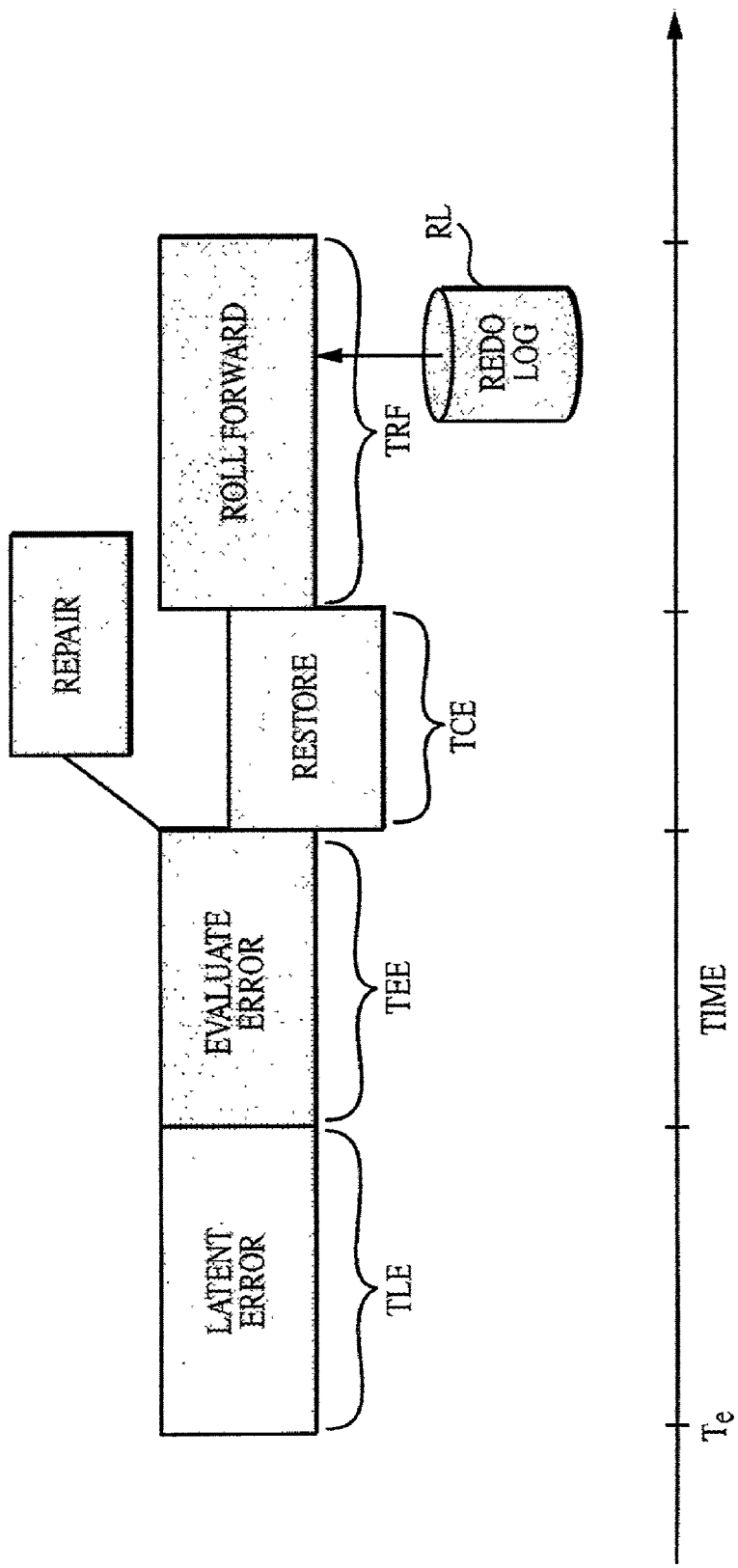
FIG. 15 is a pictorial representation of detecting and correcting errors in a data volume in an information recovery system in accordance with the present invention.

FIG. 15 shows an exemplary process for recovering from a data error, such as a transaction error in a database, in accordance with the present invention. A data error occurs at a time $t_e$ after which the system runs for a time TLE while the error is latent, i.e., unknown to the system operators, such as the database administrator. As is well known to one of ordinary skill in the art, the errors can be caused by a variety of sources including software errors, hardware errors and/or failures, and human error.

In one embodiment, a data volume replication, e.g., a copy of the database, resides on disk as a BCV, which is mounted on a remote host and verified with so-called data scrubbing tools. Data scrubbing tools for examining data integrity are well known to one of ordinary skill in the art. For example, while it is understood that a variety of data scrubbing tools can be used to evaluate the integrity of the replications, one suitable data scrubbing tool can be provided from the Patrol family of products by BMC Software of Redwood Shores, Calif. Since data is stored on disk in accordance with the present invention, data scrubbing can significantly reduce the latent error time, i.e., the time during which errors are undiscovered.

In contrast, in many conventional systems, the error is not discovered until a person, such as a customer, queries the database operator regarding an irregularity with the customer's account, for example. As known to one of ordinary skill in the art, data living on tape cannot be examined without data restoration and recovery.

After confirmation that an error has occurred, a time TEE elapses in which the error is evaluated to determine potential corrective measures. For example, an operator can evaluate the type of error, how the error occurred, how widespread the error is, what is the impact of the error, when the error occurred, and how the error may be corrected. The level of expertise of the operator, e.g., database administrator, largely determines the time required to evaluate the error.

During error evaluation, the system can create an on-demand replica of the database for mounting on another host. This enables multiple evaluations to be performed in parallel by one or more evaluation teams. In addition, destructive evaluations can be performed on alternate hosts since the production database is available for further replications.

In general, after evaluation of the error an operator decides to correct the error during a time TCE. The operator can restore backed up data (checkpoint) or attempt repair of the production database. By creating another replication prior to attempting repair, the operator can freely attempt repair of the live database. That is, the operator can attempt risky "shot in the dark" repairs since multiple checkpoints exist. In the case where the operator's attempted solution fails to repair the error, or makes it worse, a checkpoint can be readily restored, recovered, and updated from the redo logs. A further copy of the database can be used for trying additional potential solutions. Alternatively, solutions can be tried on a copy of the database prior to modifying the production database.

If a restore is selected over repair, the user must decide which backup is to be restored. Ideally, this is the most recent backup before the database became corrupt. If the exact time at which the error occurred is not known, the user may have to guess which backup is to be restored.

In prior art systems, the user had to do a restore from the selected backup. After completion of the restore, which can be many hours later, the user can check if the selected backup is free of corruption. If not, the user must do another restore from a further backup. Such multiple restores are rendered unnecessary by the IR system of the present invention since the user can mount the selected backup on another host and check the backup for errors. Upon finding an error-free backup, a single restore can be performed.

In many prior art systems, so called surgical repair of the production database is the preferred option due to time and effort associated with restoring data from tape. For relatively large databases, e.g., more than a Terabyte, data restoration from tape can take many hours. In addition, for certain mission critical databases, surgical repair is virtually the only option in view of the incredible costs associated with bringing down a database. However, the concomitant risks of damaging such a database in attempting to repair an error are readily apparent.

During a further time TRF, after restore of the checkpoint, the roll forward process attempts to place the database up to date with transactions that occurred since the database copy was frozen, which are recorded in the redo log RL. The roll forward process is iterative since the database should be checked for errors as the recorded transactions injected into the database. By incrementally rolling forward, the database can be updated at discrete points. If an error is detected, the roll forward process need only revert back to the last known error-free point. Conventional tape-based systems do not provide this ability due to the incompatible formats between tape and disk.

It is understood that an operator can readily vary the particular error detection and correction steps depending upon the requirements of a particular application. For example, varying scheduled and on-demand checkpoints can be generated for use in finding an error correction solution.

Figure 16:
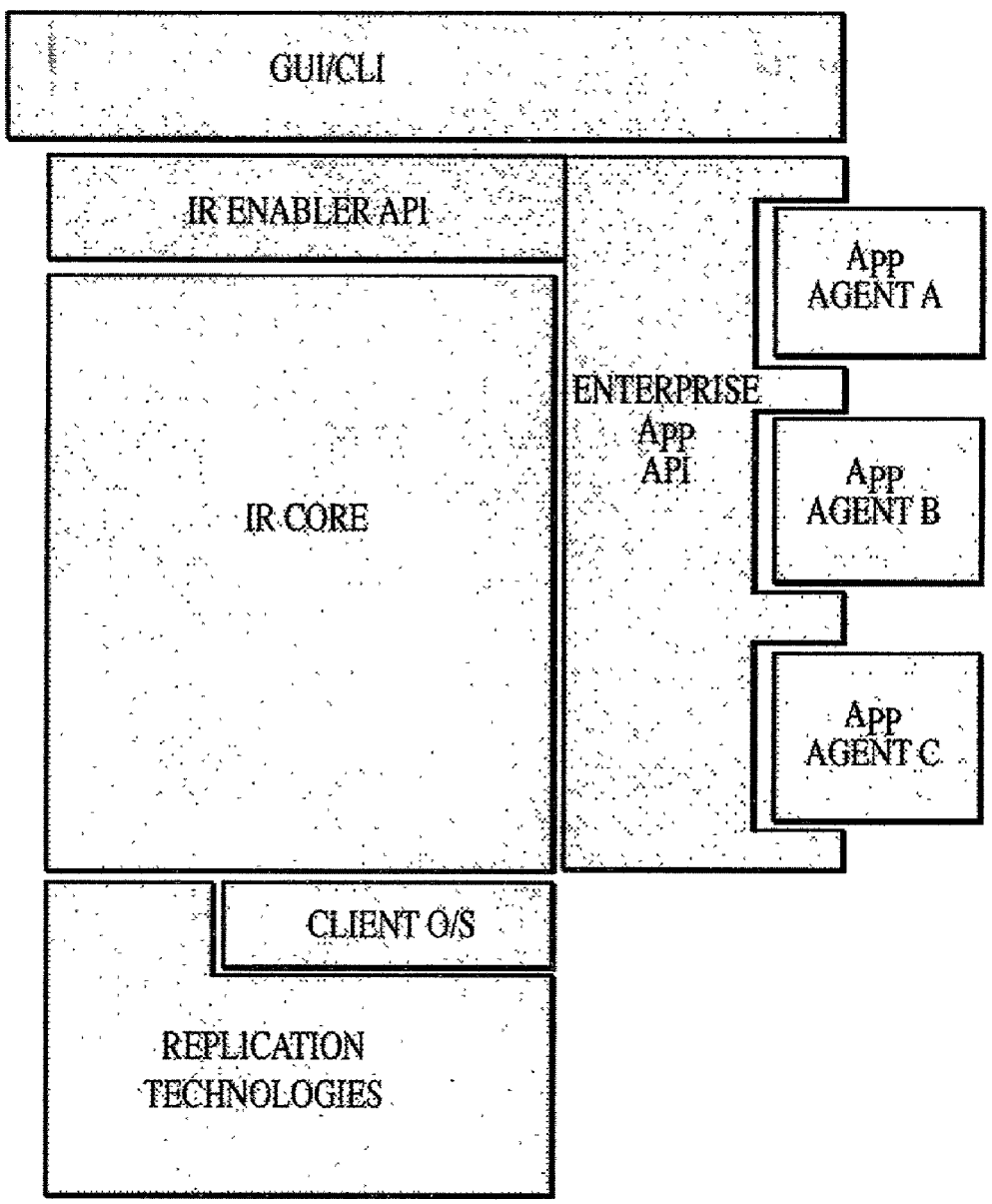
FIG. 16 is a pictorial representation of an exemplary flexible architecture for an information recovery system in accordance with the present invention.

FIG. 16 shows an exemplary information recovery system architecture having the flexibility to readily support a variety of application agents, operating systems, and replication technologies. In general, an IR core communicates with a graphical user interface (GUI) or command line interface (CLI) via an IR enable Application Programming Interface (API). Various application agents A, B, C communicate with the IR core via an enterprise application API. The IR core can support multiple client operating systems and replication technologies. The separation of applications and replication technologies with a common interface to the core enables the addition of new applications and replication technologies without changing the core. For example, new replication technologies, which can include new hardware, new host-based software replications, and/or third party copy, e.g., SCSI XCOPY, devices, can be readily added. New databases and application can also be readily added including new filesystems, new relation database management systems (RDBMS), and new financial and E-mail applications. And new user interfaces, new scripting, and new host platforms can be readily supported.

In a further aspect of the invention, a portion of a database replication can be mounted to a host computer. While the invention is described in conjunction with tablespaces in an Oracle database, it is understood that the invention is applicable to further database types and components. In addition, it is understood that Oracle terms are used to facilitate an understanding of the invention and should not be construed as limiting the invention to a particular database type or configuration.

Figure 17:
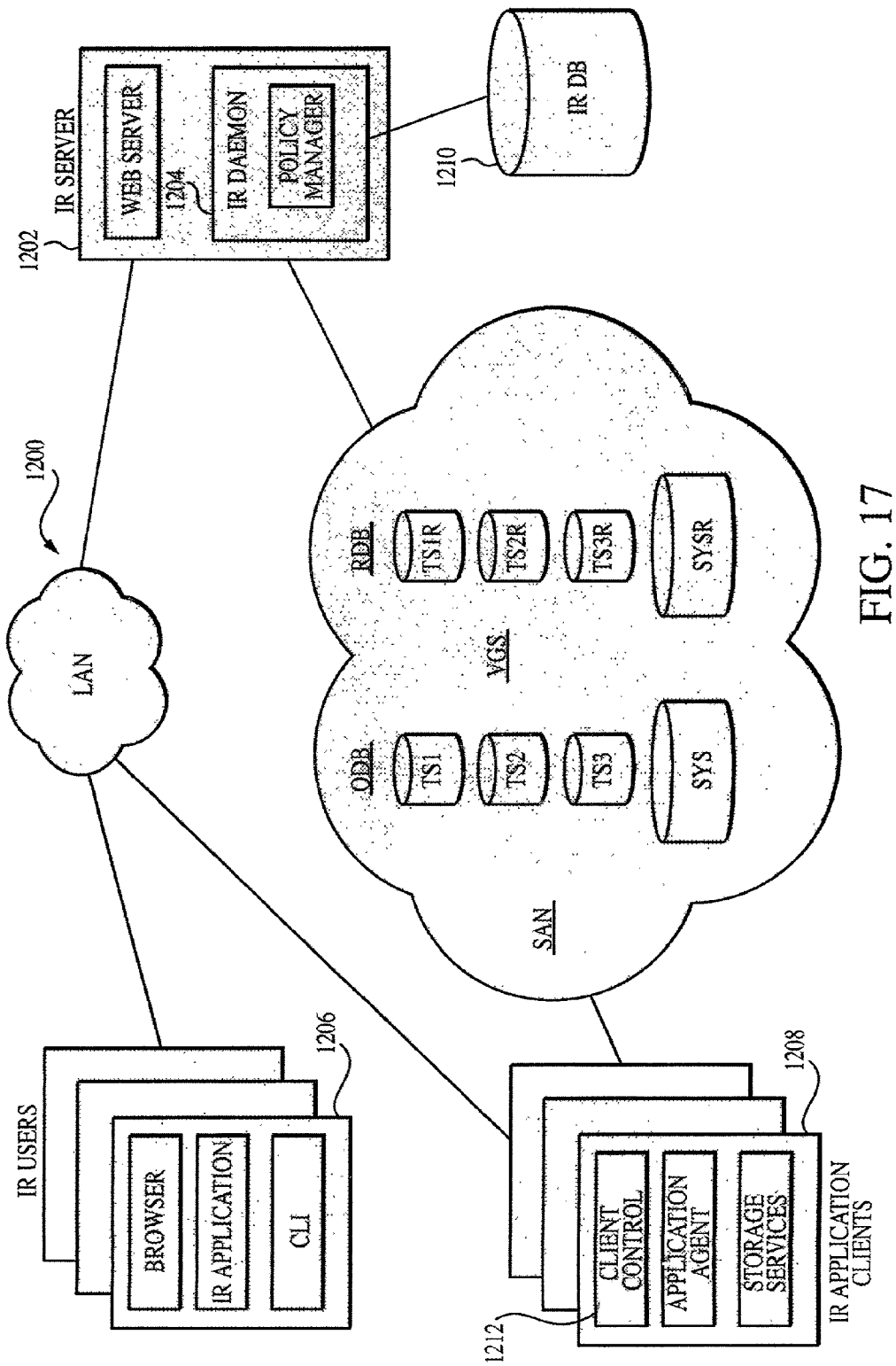
FIG. 17 is a schematic depiction of an information recovery system having partial database replication mounting in accordance with the present invention.
Figure 18:
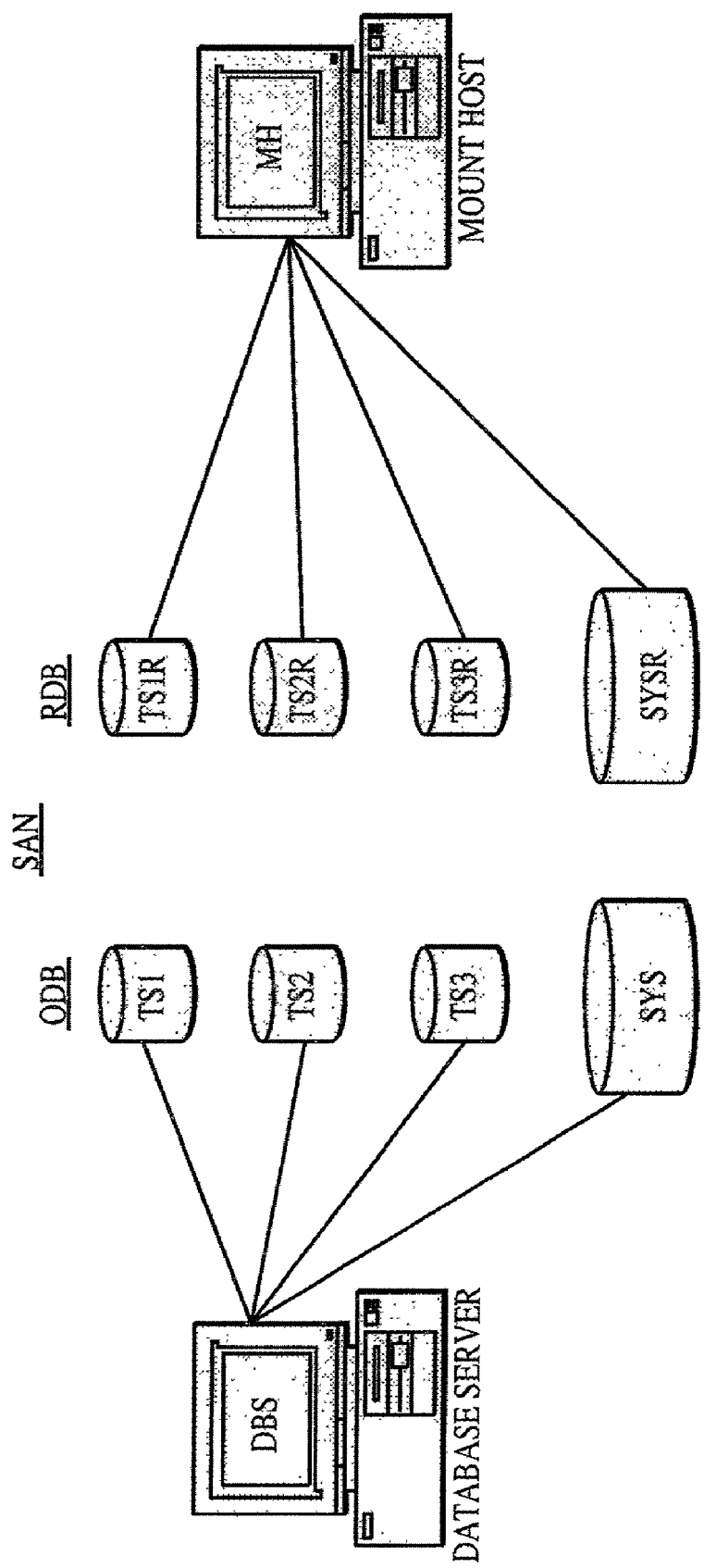
FIG. 18 is further schematic depiction of an information recovery system mounting a partial database replication on a target mount host in accordance with the present invention.

FIGS. 17–18, which have some similarity with FIG. 1, show an exemplary IR system 1200 having partial database replication mounting in accordance with the present invention. The IR server 1202 includes an IR daemon 1204 for handling replication requests from host computers, such as IR users 1206. IR application clients 1208 operate as a database server DBS (FIG. 18) for applications, such as Oracle databases stored on volume groups VGS in the storage area network SAN. An IR user 1206 or mount host MH (FIG. 18) has visibility to a replicated database RDB, which was replicated from an original database ODB.

In the illustrated embodiment, the production or original database ODB is located in the storage area network SAN and runs on the database server host DBS. The original database ODB includes first, second and third tablespaces TS1, TS2, TS3, along with system information SYS. The replication RDB of the original database ODB also includes corresponding tablespaces TS1R, TS2R, TS3R and system information SYSR. Generation of the database replication is described in detail above. The replication database ODB is visible to an IR user, e.g., mount host MH (FIG. 18). It is understood that the mount host MH and the database server DBS are substantially similar, e.g., running the same operating system, etc.

As described above, the IR daemon 1204 runs on the IR server 1202. Replication information, such as mapping files, is contained in the IR database 1210. The IR database has the information required to mount and start up a replication. This information is captured during creation of the replication, as is also described above. The client control module or daemon 1212 (FIG. 17) runs on the database server DBS and the mount host MH. The client control module running on the mount host receives the data volume mapping file along with any other necessary information from the IR server 1202 to mount the replication database RDB.

In general, the system can start up a partial replication database, e.g., tablespaces selected by a user as described above, in a variety of modes. For example, the operator can select table space one TS1 for startup so that the second and third table spaces TS2, TS3 are ignored. After mounting, the first table space TS1 is available for user by an operator.

In one embodiment, a partial replication database, e.g., the first tablespace TS1, can be started up in recovered mode, recovered read only mode, and no recover mode, which are described below. Further modes for meeting the requirements of a particular application will be readily apparent to one of ordinary skill in the art.

Figure 19:
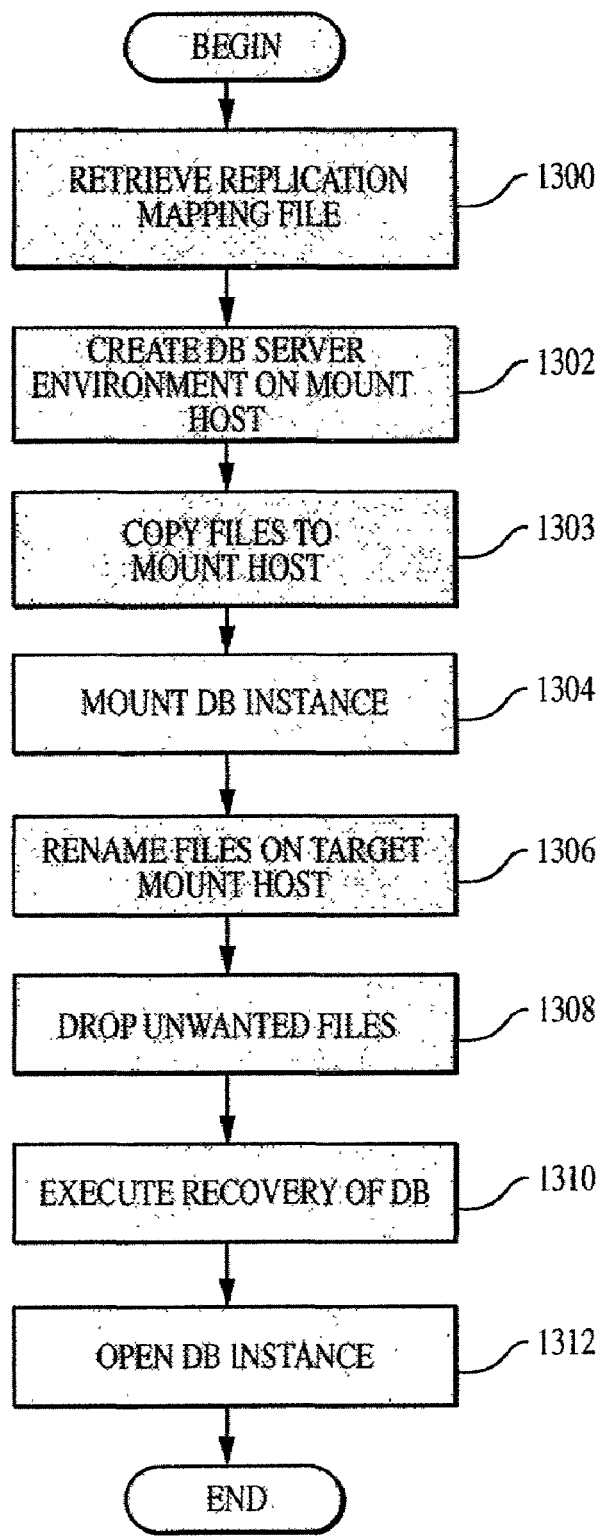
FIG. 19 is a flow diagram showing an exemplary sequence of steps for mounting a partial replicated database in accordance with the present invention.

FIG. 19 shows an exemplary sequence of steps for starting up a partial database replication in accordance with the present invention. In step 1300, the mount host retrieves the replication database mapping file from the IR database via the IR server. A database server for controlling the replicated database is then created on the mount host in step 1302. Creating the database server can include, for example, importing volume groups, starting volumes, and mounting file systems. In step 1303, the system copies the appropriate backup control file, as well as archive logs, the init<sid> file and the password file, to the required location on the mount host. In step 1304, the database instance, e.g., the replicated Oracle database, is mounted on the target mount host, as described in detail above. It is understood that the replication can be mounted to a target host where the replicated instance does not exist yet. That is, the system expects the mount host to have the Oracle application installed and that the object instance to be mounted is not already running on the host.

In one embodiment, the application layer of the client control daemon receives a mapping or tree file describing what is to be recovered. The original tree is generated during the replication of the application and is stored in the IRD catalog/database on the IR server. This mapping is made available to the client control running on the mount host. The tree contains what needs to be mounted and is built from what the user requests. So the user selects a partial tree from the original tree. This partial tree file is compared to the original tree describing what is contained in the replication database. This allows the client control daemon to determine those tablespaces, e.g., TS2 and TS3, that do not need to be recovered. The log files can be copied over to the target host, as well as other information files, such as the initinstance.ora file and two backup control files (a read-only version and a regular version) for Oracle applications.

For a start up in recovery mode, in step 1306 the database volume groups and/or raw devices are renamed from the original host names to new names on the target mount host. For example, Oracle statements are executed to make the Oracle database aware of the name changes. It is understood that the password file is brought over from the IR database for the replication. In one embodiment, the backup control files are automatically copied to the location where the real control files are supposed to be, ready for oracle to use. The backup control files are copied to the archive log directory on the mount host. The control files are copied to the locations described by the init<SID>.ora file of the application host for Oracle applications, at the time of replication. The description of this location is actually cataloged, e.g., by querying the database, at the time of the replication. Depending on whether it is a read-only recover or a recover, the appropriate backup control file is copied into the above-specified location. After copying the control files, the IR Application agent software will apply the appropriate permissions and ownership.

After applying the restored password file, in step 1308 the unwanted information, e.g., TS2, TS3, is deleted so that only the tablespaces previously selected for recovery by the user, e.g., TS1, are recovered. The recovery of the first tablespace TS1 is then executed in step 1310. After copying the appropriate control files, the database is mounted and renamed if necessary. Unwanted datafiles are then dropped (dropping datafiles updates the control files), and then the entire database is recovered. Oracle ignores the dropped datafiles and recovers only the tablespaces that are selected for mounting as defined by the control files. In step 1312, the Oracle database instance is then opened and available for use.

In the no recover mode, the oracle layer does not issue any oracle recovery commands. It simply keeps the tools available for the user. That is, the initinstance.ora, the logs, the data files and the backup control files are available. The user can then recreate a password file and execute the recovery manually.

In the readonly startup mode, the system behaves similarly to the recover mode except that the backup control file that is copied to the real control file location is the read-only version, and the instance is recovered and opened in standby mode.

In another aspect of the invention, an information recovery system selects storage for replication of a data volume. In general, the system selects replication storage based upon criteria provided by the user and performance characteristics based upon the architecture of the storage system. While the invention is described in conjunction with a Symmetrix type storage architecture and terminology, it is understood that the invention is applicable to systems in which it is desirable for replication storage to be selected based upon performance. It is further understood that standard volume and data volume are used interchangeably as are BCV and replication.

Figure 20:
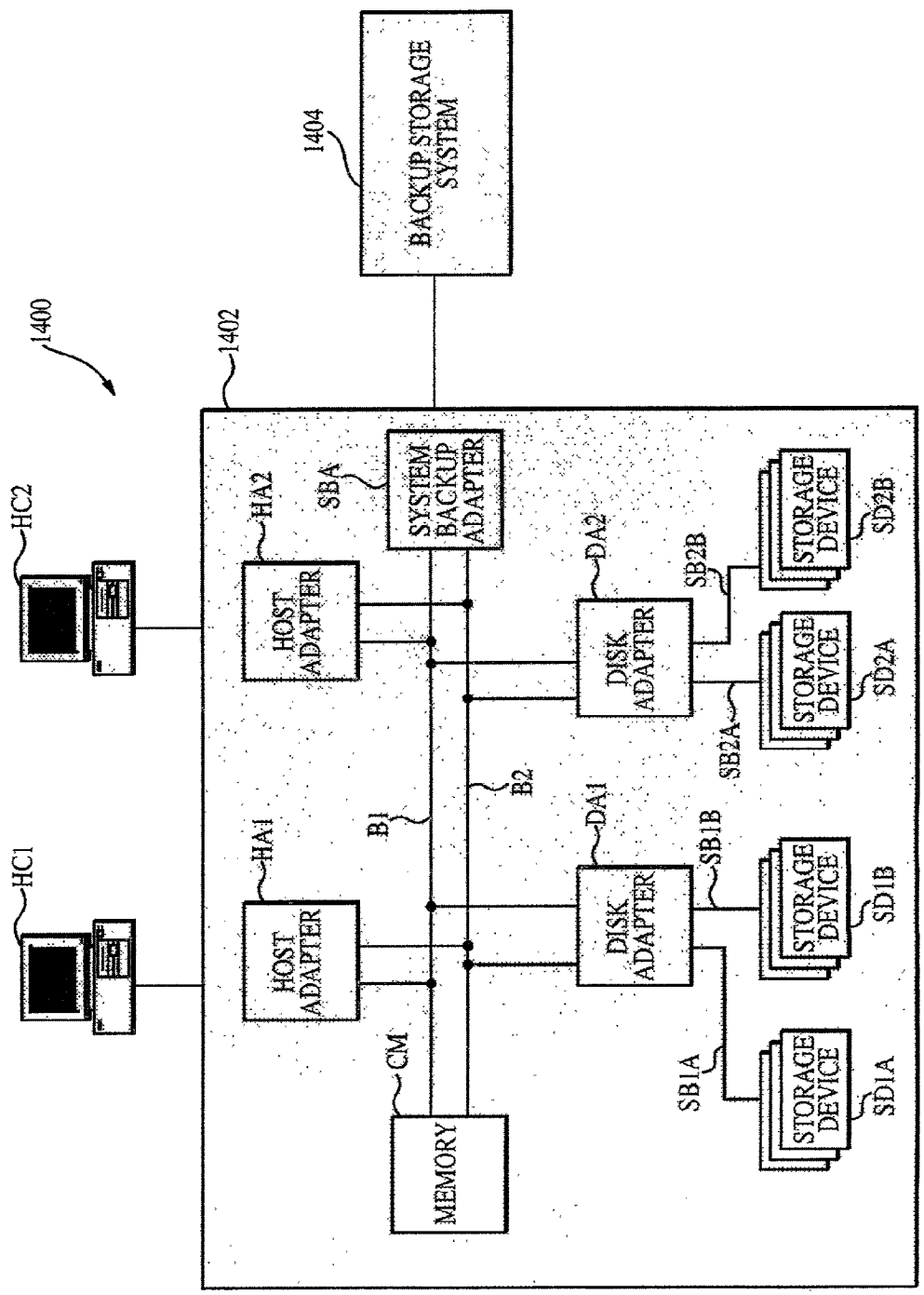
FIG. 20 a schematic depiction showing further details of an exemplary architecture of a data storage system that can form a part of an information recovery system in accordance with the present invention.

FIG. 20 shows an information recovery system 1400 having automated storage selection for data volume replications in accordance with the present invention. The system 1400 includes a data storage system 1402, which can correspond to a Symmetrix type device shown in FIG. 3. A backup storage system 1404 can be coupled to the data storage system 1402. As described above, one or more hosts HC1, HC2 can be coupled to the data storage system.

In the illustrated embodiment of the data storage system 1402, cache memory CM is coupled to first and second cache buses B1, B2 to maximize data capacity through the cache memory. The first and second host adapters HA1, HA2, the first and second disk adapters DA1, DA2, and the system backup adapter SBA, are also coupled to the first and second cache buses B1, B2.

In one particular embodiment, first and second sets of storage devices SD1A, SD1B are coupled to the first disk adapter DA1 and third and fourth sets of storage devices SD2A, SD2B are coupled to the second disk adapter DA2. The disk adapters DA1,DA2 are coupled to the storage devices via respective storage buses SB1A–B, SB2A–B, such as a SCSI bus.

Figure 21:
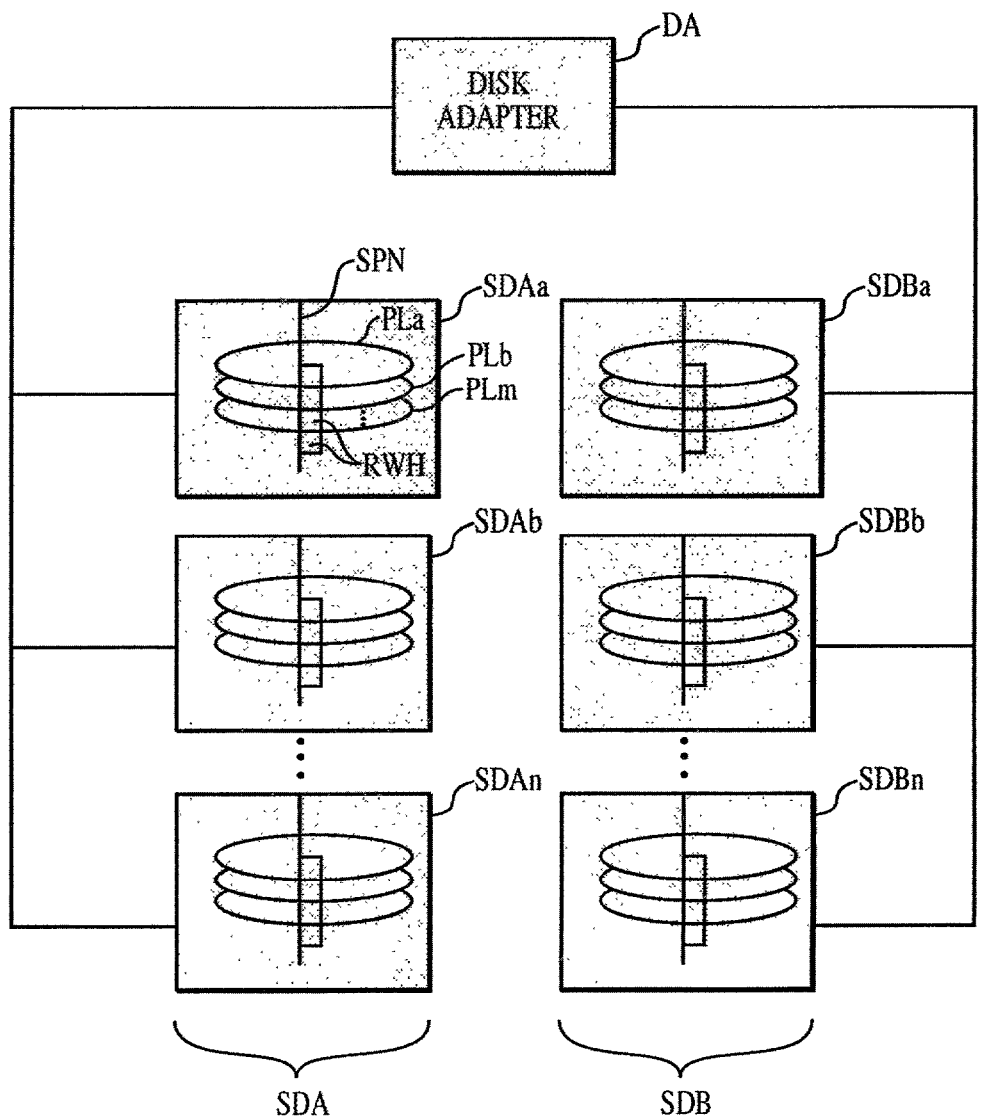
FIG. 21 is a pictorial representation of a disk storage device that can form a part of the system of FIG. 20.

FIG. 21 shows a disk adapter DA coupled to exemplary first and second storage device sets SDA, SDB, each of which comprises a plurality of disk arrays SD1a-N. The disk arrays have a series of aligned platters Pla-M connected to a spindle SPN. Read/Write heads RWH enable access to the top and bottom of each of the platters PL. In this embodiment, the read/write heads do not move independently. At any one time, one track from the disk array can be accessed.

Due to the architecture described above, certain performance considerations are apparent when selecting replication storage for a data volume. It is understood, as described above, that the data storage system receives requests from the hosts HC in terms of logical volumes that are translated to physical storage and vice-versa. For example, placing a BCV on a disk coupled to the same spindle SPN as a disk containing a standard volume creates so-called spindle contention. It is readily apparent that spindle contention will dramatically increase the time required to replicate a data volume. Storage bus SB, which can be a SCSI bus, contention can also occur if one particular disk device is excessively loaded. Typically, a SCSI bus provides a bandwidth is significantly greater than that of the disk devices. In addition, memory bus B1, B2 contention can occur if the overall memory load is significantly unbalanced. Further instances of resource contention will be readily apparent to one of ordinary skill in the art. The information recovery system takes these performance limitations into account when requested by a user to select replication storage for a data volume.

At initialization, the information recovery system requests that the user configure the available storage in the data storage system. The user is requested by the system to configure the total storage space into discrete storage locations or chunks. For example, a total of 128 GB can be configured as two 18 GB spaces, four 9 GB spaces, and the remaining space in 2 GB chunks. Each of the storage locations can be assigned a particular criteria, e.g., BCV storage. For example, the user can assign certain storage as production, test, BCV, fast, slow, blue, green, etc. At replication time, the user can define criteria for replication storage, e.g., use BCV storage. This information is contained in the IR database 104 (FIG. 1) along with other standard volume and BCV information.

Referring again to FIG. 1, in an exemplary embodiment, the replication policy manager 102b in the IR server selects storage based upon data volume and replication information in the IR database along with architecture considerations described above. In general, the replication policy manager 102b determines potential storage locations for each data volume requested to be replicated. The policy manager 102b communicates with the client control module 112a on the IR application client 112, which discovers the data volume, e.g, database, as described above, and catalogs the database information. The discovered information along with storage information in the IR database is used to select acceptable storage for replications.

In an exemplary embodiment, for each standard volume, a pair score is determined for each potential storage space. The pair score reflects the level of performance afforded for each replication space. Each pair score is independent of replication storage selections for other standard volumes. After pair score computation, a group score is compiled for each solution group based upon the pair scores. If the group score meets a predetermined threshold, the corresponding storage solution is returned and the replications are executed.

Figures 1, 22:
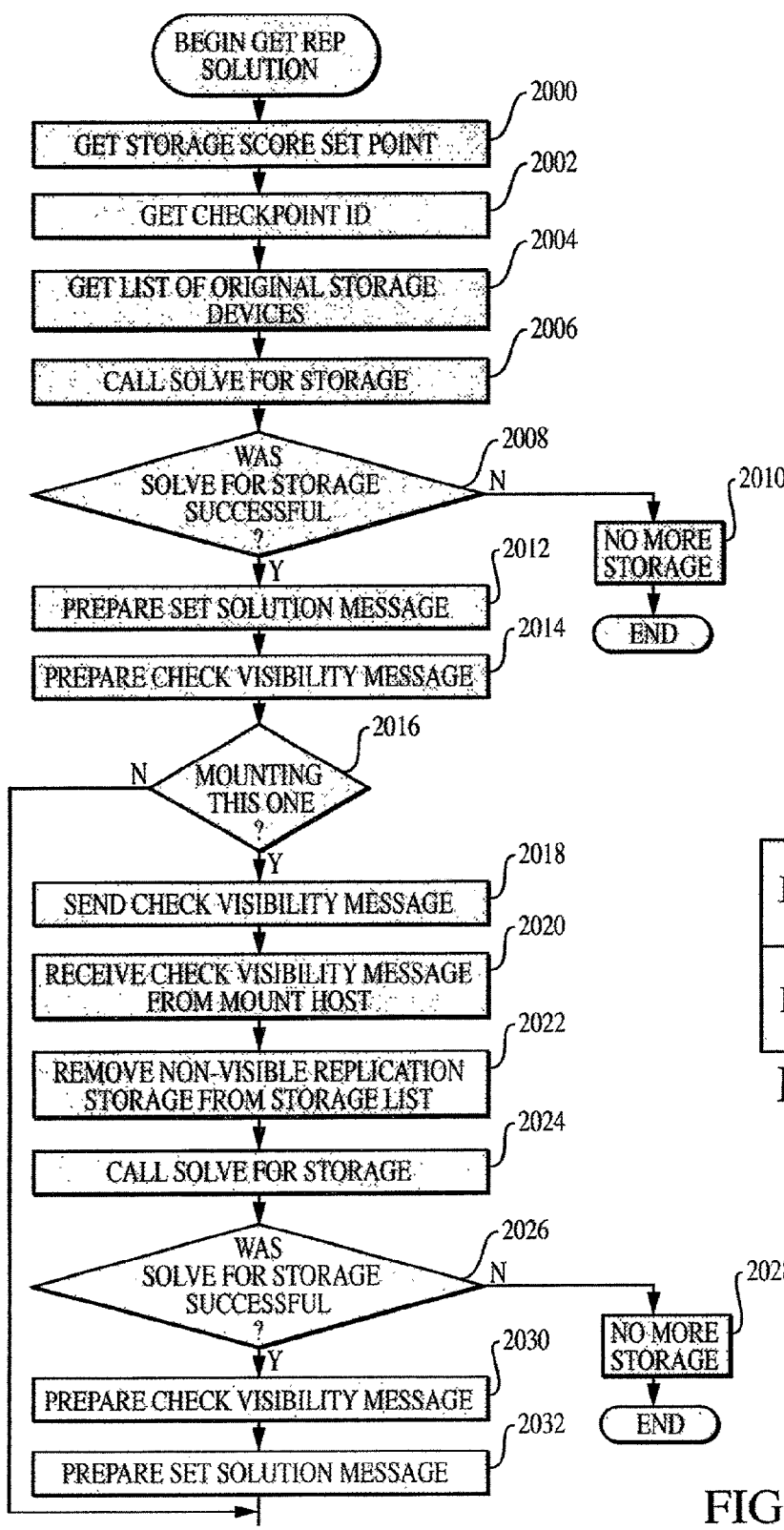
FIG. 22 shows the relationship between FIGS. 22-1 and 22-2 which when taken together is a flow diagram showing an exemplary sequence of step for obtaining a replication storage solution for an information recovery system in accordance with the present invention.
Figures 2, 22:
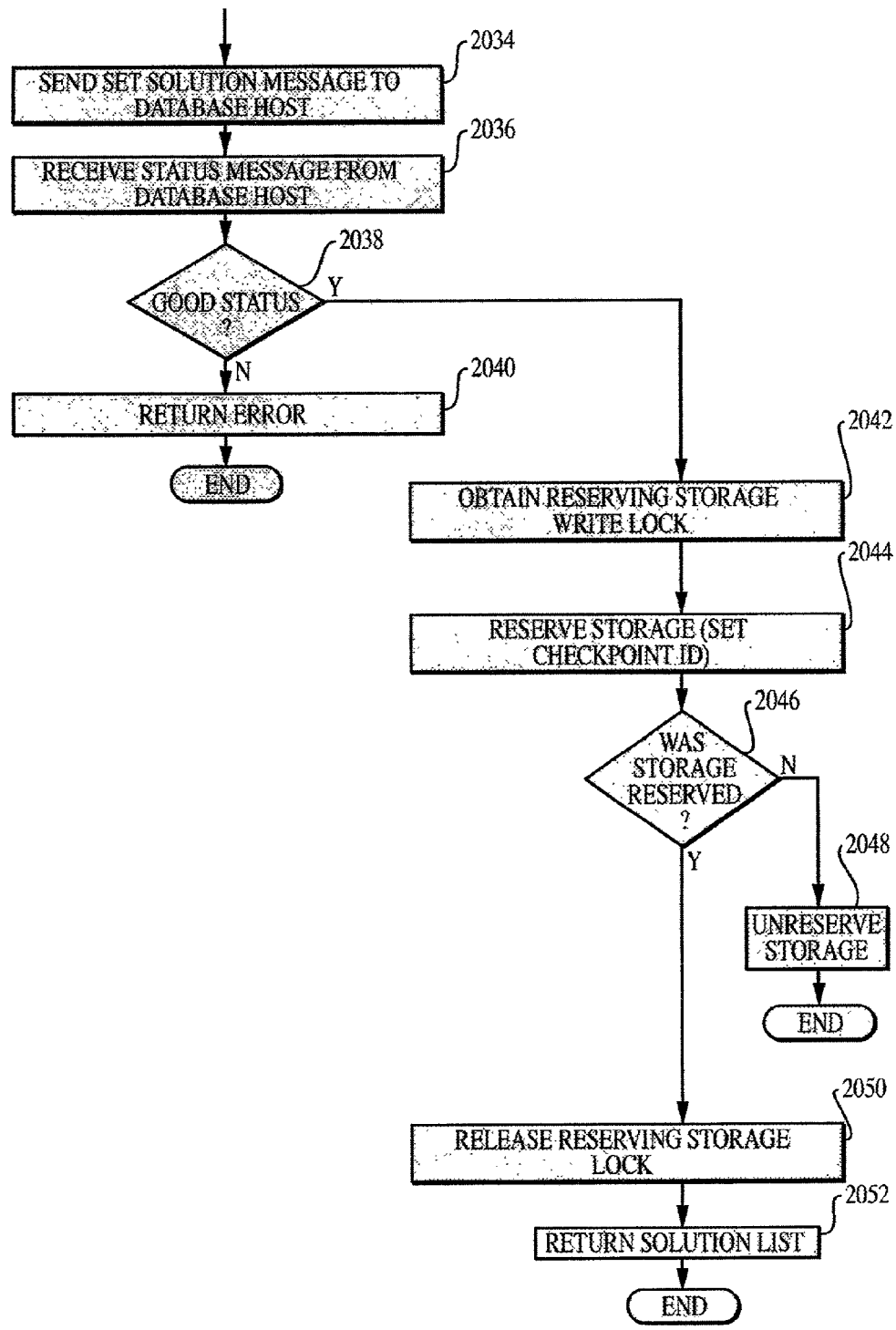

FIG. 22 shows an exemplary sequence of steps for selecting replication storage in an information recovery system accordance with the present invention. It is understood that the data storage system has previously been configured by the user. The below steps assume that storage selection is requested for a plurality of data volumes (standard volumes).

In step 2000, the system requests and receives a storage score set point. In an exemplary embodiment, the set point is a static value and stored, such as in the IR database. Alternatively, the set point can be adjusted in a variety of ways, including based on system history, e.g., running average, and manual intervention. In step 2002, the system receives checkpoint ID information from the ID database. This information enables the policy agent to determine which storage locations, if any, are already assigned to this checkpoint. As described above, a storage area previously established with a standard volume can be incrementally established relatively quickly by updating invalid tracks. In step 2004, the system retrieves a list of original storage devices based upon the standard volumes requested to be replicated.

In step 2006, a call to a solve for storage routine is made. Based upon the return value, it is determined in step 2008 whether there is no available storage in step 2010, or a set solution message is prepared in step 2012. A set solution message, when ultimately sent to the client control daemon, indicates what storage should be used for each BCV. In step 2014, a check visibility message is prepared to determine whether the selected replication storage is visible to the mount host. In step 2016, it is determined whether the mount host will be mounting the replication storage, e.g, BCV. If so, the check visibility message is sent to the mount host in step 2018, and in step 2020 the policy agent receives a response from the mount host. The policy agent removes from a potential solution any replication storage that the mount host indicated was not visible in step 2022. While the IR database contains host/visibility information, it is advisable to check actual visibility with the mount host since the IR database may be unaware of data storage reconfigurations.

In step 2024, the solve for storage routine is called. In step 2026, it is determined whether there is no available storage in step 2028, or whether in step 2030 the check visibility message should be prepared. In step 2032, the prepare set solution message is prepared, in step 2034 the set solution message is sent to the database host (IR application client 112 FIG. 1), and in step 2036 a response is received. Unless it is determined in step 2038 that an error status message from the database host was received so an error is returned in step 2040, a write lock on the selected storage is obtained in step 2042. In step 2044, the checkpoint ID is set for the reserved storage. In step 2046, it is determined whether the storage was successfully reserved. If not, in step 2048 the storage is unreserved. If the storage was reserved, the reserving storage lock is released in step 2050. In step 2052, the solution list is sent to the database host by the policy agent. The data volumes can then be replicated as described above.

Figure 23:
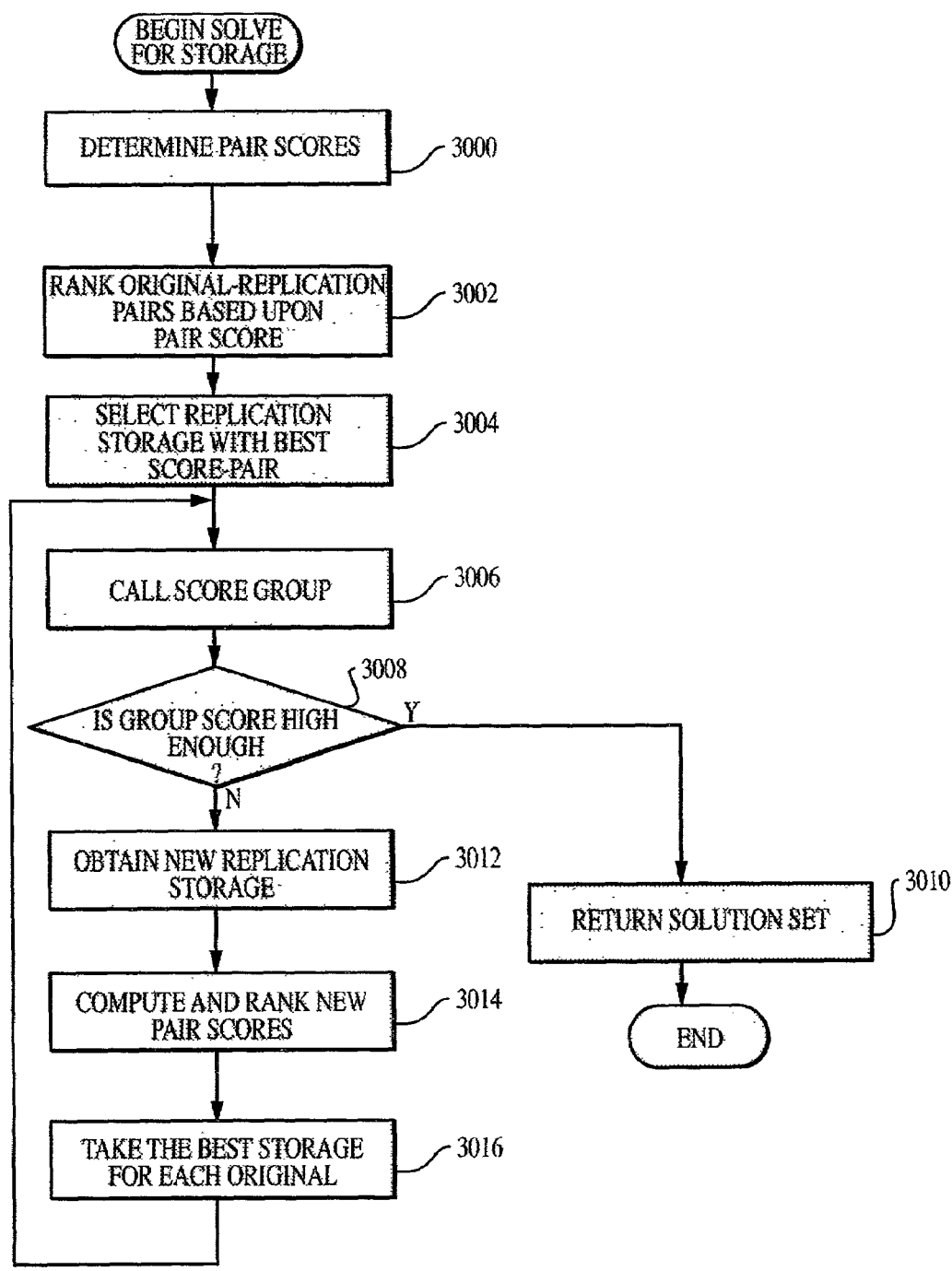
FIG. 23 is a flow diagram showing an exemplary sequence of steps for implementing a solve for storage routine in accordance with the present invention.

FIG. 23 shows an exemplary sequence of steps for implementing the solve for storage routine. In step 3000, a pair score for each potential replication storage location for a standard volume is determined, as described more fully in FIG. 24 below. The pair scores are then ranked in step 3002, and in step 3004 the best scoring replication storage for each standard volume to be replicated is selected. In step 3006, the group score is computed by the score group routine, as described below in FIG. 25.

In step 3008, it is determined whether the group score is greater than a predetermined threshold. If so, in step 3010 the solve for storage routine returns the replication solution, which is ultimately sent to and used by the database host. If the score is not above the threshold, in step 3012 new replication storage locations are obtained. For example, another set of storage locations is obtained from the IR database. In one embodiment, four potential storage locations for each standard volume to be replicated are obtained. In step 3014, the new pair scores are computed and ranked. The best orignal-replication pair is selected in step 3016 and the group scores are again computed in step 3006. The replication pair and group scoring processing continues until an acceptable storage solution is returned or until failure.

Figures 2, 24:
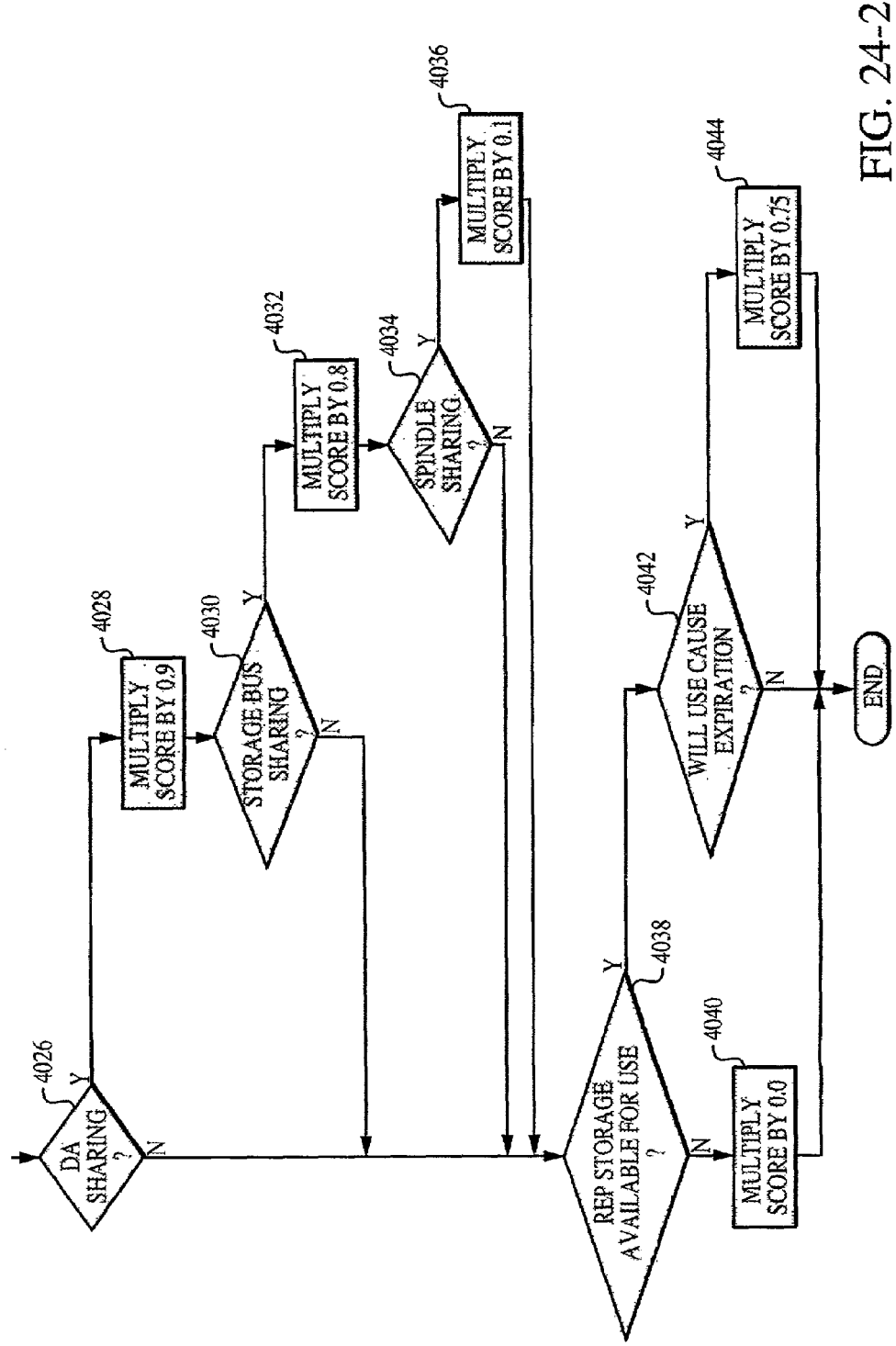
FIG. 24 shows the relationship between FIGS. 24-1 and 24-2 which when taken together is a flow diagram showing an exemplary sequence of steps for determining a pair score in accordance with the present invention.

FIG. 24 shows an exemplary sequence of steps for determining a pair score for an original/replication storage pair in accordance with the present invention. In general, the pair score is determined by weighting a series of performance characteristics, e.g., resource contentions, based upon the selected replication storage for the standard volume. The pair score provides an independent performance assessment for the particular orignal/replication storage pair. That is, each pair score does not take into account that two acceptable pair scores for respective standard volumes can incur substantial performance degradation due to the particular storage combination. The group score attempts to identify incompatible storage selections by examining the overall resource contention, for example, for a potential storage solution.

While a particular resource weighting scheme is described, it is understood that a wide variety of techniques well known to one of ordinary skill in the art can be used to identify pairs that will result in poor replication performance. In the particular embodiment described below, reference is made to degrading the pair score and other like terms. It is understood that such terms are relate to one being the best score and zero being the worst score. Thus, weighting near one, such as by multiplying by 0.9 is relatively good.

In step 4000, the system obtains the original and replication storage characteristics for the pair and compares storage sizes for compatibility. In step 4002, it is determined whether the replication storage is the same size, for example, as the original storage. If not, the pair is identified as unacceptable, such as by setting the score for the pair to zero in step 4004. If the original and replication storage are the same size, in step 4006 the pair score is set to a predetermined value. In step 4008, it is determined whether the replication storage is established. If not, in step 4010 the pair score is set to a good value or biased downward, such as by multiplying the score by 0.8. In step 4012, it is determined whether the BCV is associated, i.e., previously established with some standard volume. If not, the score is multiplied by a relatively high factor, such as 0.8, in step 4014. If yes, it is determined whether the BCV is associated with the paired standard volume in step 4016. If not, the pair score is multiplied by 0.5, for example, in step 4018. If yes, in step 4020, the percent of invalid tracks is determined. The number of invalid tracks determine how much time is required to re-establish the storage pair. The pair score is multiplied by a factor indicative of the number of invalid tracks, such as the percent of invalid tracks multiplied by 0.5 for example.

If the BCV was established, as determined in step 4008, it is determined in step 4022 whether the BCV is established with the paired standard volume. If yes, the number of invalid tracks is determined and the pair score concomitantly adjusted in step 4020. If not, the pair score is significantly degraded, such as by multiplying by 0.05, in step 4024.

In step 4026, it is determined whether the standard/BCV share a disk adapter. Disk adapter sharing is shown and described above. If the pair share a disk adapter, in step 4028 the pair score is mildly degraded, such as by multiplying by 0.9. In step 4030, it is determined whether the pair shares a disk adapter SCSI bus. If yes, the score is degraded, such as by multiplying by 0.8 in step 4032. In step 4034, it is determined whether the pair shares a spindle. If so, the score is significantly decreased such as by multiplying by 0.1 in step 4036.

In step 4038, it is determined whether the BCV is available for use. If not, the pair score is set to zero, e.g., fail, in step 4040. If yes, it is determined whether use the BCV will cause the expiration of an existing BCV in step 4042. If yes, in step 4044 the score is multiplied by 0.75, for example. If not, the resultant pair score is returned.

It is understood that a pair score is determined for each standard volume to be replication and potential replication storage location.

Figure 25:
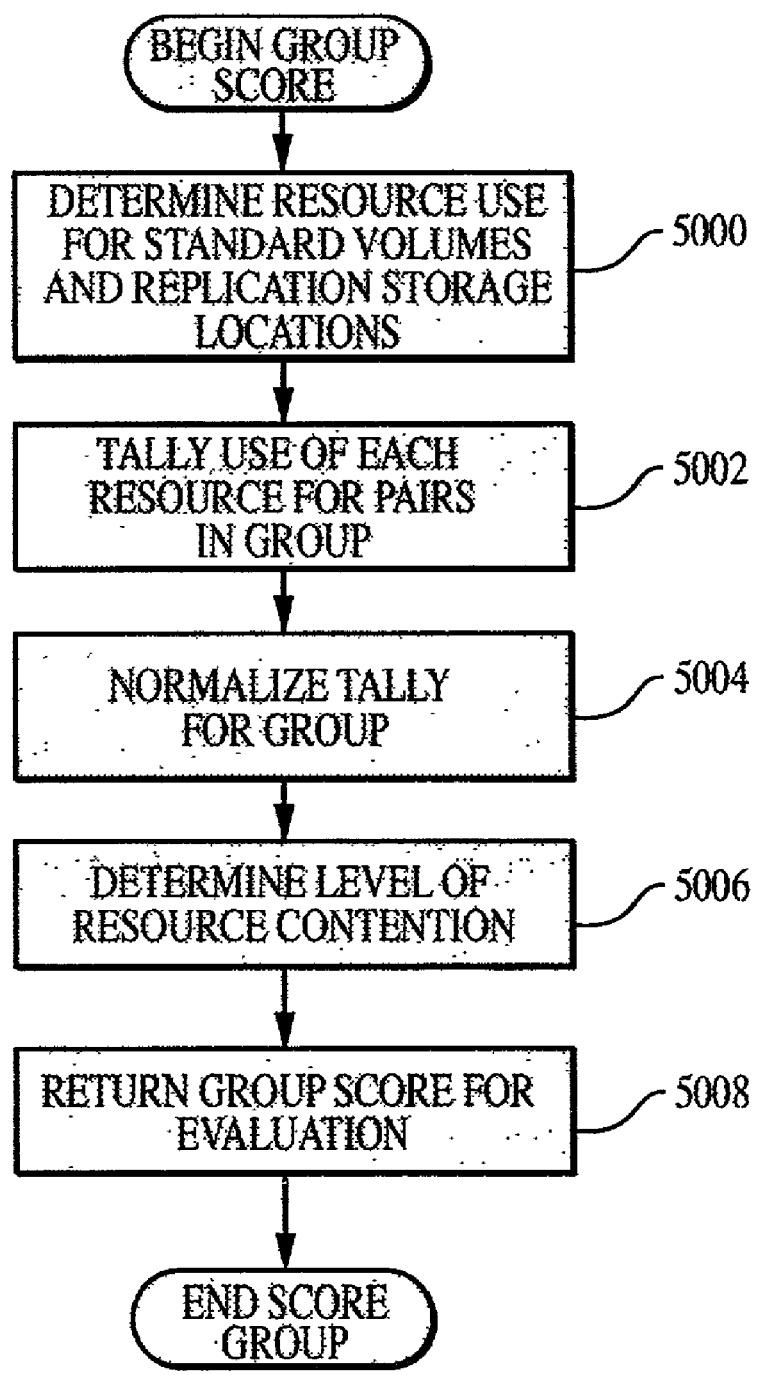
FIG. 25 is a flow diagram showing an exemplary of step for determining a group score based upon the pair score of FIG. 24.

FIG. 25 shows an exemplary sequence of steps for determining a group score in accordance with the present invention. In step 5000, the policy agent determines which resources are used by each standard volume and each BCV in the group. In step 5002, a tally for each resource is computed based upon the standard/BCV pairs. For example, a group of twenty standard/BCV pairs has a specific number of disk storage devices that share a spindle, SCSI bus, etc. In step 5004, the group size is normalized, such as by determining a contention percentage for each resource. The level of contention for each resource is then determined in step 5006, such as by multiplying by the normalized factors. In step 5008, the group score is returned for evaluation against a predetermine threshold in step 3008 of FIG. 23.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. In a data storage system having data recovery, a method for automatically selecting storage for a data volume, comprising:

receiving a request to replicate at least one data volume;

obtaining a plurality of replication storage locations in the data storage system that may be used for the requested replication;

determining whether the plurality of replication storage locations have sizes compatible with the at least one data volume;

identifying resource contention for each standard volume and potential replication storage solution; and selecting a respective one of the plurality of replication storage locations for each standard volume replication request.

2. The method according to claim 1, further including limiting replication storage selection to those matching assigned criteria.

3. The method according to claim 2, further including requesting a user to configure available storage at initialization.

4. The method according to claim 3, wherein the configuration request includes a criteria assignment.

5. The method according to claim 3, wherein the configuration request includes dividing the available storage into a plurality of storage locations.

6. The method according to claim 1, wherein the resource contention can include storage device bus contention, disk spindle contention, memory bus contention, disk adapter contention, and host bus contention.

7. The method according to claim 1, further including generating pairs comprising a first one of the at least one data volume to be replicated and a respective one of the plurality of replication storage locations.

8. The method according to claim 7, further including identifying system resource use by each of the pairs.

9. The method according to claim 8, further including selecting one or more pairs based upon the level of resource contention.

10. The method according to claim 9, further including weighting resources used by a pair.

11. The method according to claim 8, further including ranking the pairs based upon resource contention level.

12. The method according to claim 7, further including defining a group of pairs based upon the resource contention.

13. The method according to claim 12, further including determining a group score for the group of pairs that is indicative of overall replication performance.

14. The method according to claim 13, further including determining whether to accept a replication solution corresponding to the group of pairs based upon the group score.

15. The method according to claim 7, further including determining whether the pairs contain a replication storage location that is established with the paired data volume.

16. The method according to claim 7, further including determining whether the pairs contain a replication storage location that is associated with the paired data volume.

17. The method according to claim 16, further including computing a number of invalid tracks for a pair.

18. The method according to claim 1, further including translating logical volume information and physical storage information for at least one data volume.

19. The method according to claim 18, wherein the logical volume information and physical storage information is translated by a data storage device.

20. The method according to claim 1, further including determining whether a potential replication storage solution is visible to the requesting host.

21. A data storage system that enables information recovery, comprising:
a data storage system including a plurality of storage devices;
a first and second computer system in communication with the data storage system; and
computer-executable logic that enables:
receiving a request to replicate at least one data volume;
obtaining a plurality of replication storage locations that may be used for the requested replication;
determining whether the plurality of replication storage locations have sizes compatible with the at least one data volume;
identifying resource contention for each standard volume and potential replication storage solution; and
providing a respective one of the plurality of replication storage locations for each standard volume replication request.

22. The system according to claim 21, further including limiting replication storage selection to those matching assigned criteria.

23. The system according to claim 21, wherein the resource contention can include storage device bus contention, disk spindle contention, memory bus contention, and host bus contention.

24. The system according to claim 21, further including generating pairs comprising a data volume to be replicated and a potential replication storage location for the data volume.

25. The system according to claim 24, further including identifying resource use by each of the pairs.

26. The system according to claim 24, further including selecting one or more pairs based upon the level of resource contention.

27. The system according to claim 24, further including defining a group of pairs based upon the resource contention.

28. The system according to claim 27, further including determining a group score for the group of pairs that is indicative of overall replication performance.

29. The system according to claim 28, further including determining whether to accept a replication solution corresponding to the group of pairs based upon the group score.

30. The system according to claim 27, further including weighting resources used by a pair.

31. The system according to claim 21, further including determining whether a potential replication storage solution is visible to the requesting host.

32. A computer program product for use with a data storage system, the computer program product for executing steps in a data storage system, comprising:
receiving a request to replicate at least one data volume;
obtaining a plurality of replication storage locations in the data storage system that may be used for the requested replication;
determining whether the plurality of replication storage locations have sizes compatible with the at least one data volume;
identifying resource contention for each standard volume and potential replication storage solution; and
providing a respective one of the plurality of replication storage locations for each standard volume replication request.

* * * * *

UNITED STATES PATENT AND TRADEMARK OFFICE
CERTIFICATE OF CORRECTION

PATENT NO.       : 6,978,282 B1                                    Page 1 of 2
APPLICATION NO.  : 09/946005
DATED            : December 20, 2005
INVENTOR(S)      : Dings et al.

It is certified that error appears in the above-identified patent and that said Letters Patent is hereby corrected as shown below:

Column 2,
Line 26, delete "occurred an operator" and replace with -- occurred, an operator --.
Line 28, delete "to find a correct" and replace with -- to find and correct --.
Line 32, delete "If all possible;" and replace with -- If at all possible, --.

Column 5,
Line 17, delete "FIG. 18 is further schematic" and replace with -- FIG. 18 is a further schematic --.
Line 23, delete "FIG. 20 is schematic" and replace with -- FIG. 20 is a schematic --.
Line 31, delete "sequence of step" and replace with -- sequence of steps --.
Line 41, delete "exemplary of step" and replace with -- exemplary of steps --.
Line 63, delete "referred to a replication" and replace with -- referred to as a replication --.

Column 6,
Line 9, "standard volume a part" and replace with -- standard volume as a part --.

Column 10,
Lines 19-25, replace with the following paragraph:
-- The direction of data flow for backup is from the data storage system 302 to the backup system 350 as represented by arrow 364 (the direction of dataflow for restore is to the data storage system and is in the opposite direction of arrow 364), but the BCVs 360 may be mounted on another host other than the one originally established in accordance with the methods of this invention. --.

Column 11,
Line 17, delete "BCV's" and replace with -- BCVs --.
Line 27, delete "can created" and replace with -- can be created --.
Line 44, delete "is in manner" and replace with -- is in a manner --.
Line 58, delete "is step 8oz." and replace with -- in step 8oz. --.

Column 12,
Line 36, delete "in step in 1100" and replace with -- in step 1100 --.
Line 43, delete "in step in 1108." and replace with -- in step 1108. --.
Line 56, delete "STD up to date." and replace with -- STD is up to date. --.

Column 14,
Line 11, delete "transactions injected into" and replace with -- transactions are injected into --.
Line 38, delete "SCSI xcopy, devices," and replace with -- SCSI xcopy devices --.

UNITED STATES PATENT AND TRADEMARK OFFICE
CERTIFICATE OF CORRECTION

PATENT NO. : 6,978,282 B1
APPLICATION NO. : 09/946005
DATED : December 20, 2005
INVENTOR(S) : Dings et al.

It is certified that error appears in the above-identified patent and that said Letters Patent is hereby corrected as shown below:

Column 15,
Line 26, delete "for user" and replace with -- for use --.

Column 17,
Lines 32-33, delete "a bandwidth is significantly" and replace with -- a bandwidth significantly --.

Column 19,
Line 23, delete "orignal" and replace with -- original --.
Line 48, delete "are relate" and replace with -- are related --.

Column 20,
Line 27, delete "use the" and replace with -- use of the --.
Line 32, delete "to be replication" and replace with -- to be replicated --.
Line 47, delete "predetermine" and replace with -- predetermined --.

Signed and Sealed this

Eleventh Day of July, 2006

JON W. DUDAS
*Director of the United States Patent and Trademark Office*